(12) United States Patent
Mostoller et al.

(10) Patent No.: US 8,232,724 B2
(45) Date of Patent: Jul. 31, 2012

(54) END CAP ASSEMBLY FOR A LIGHT TUBE

(75) Inventors: Matthew Edward Mostoller, Hummelstown, PA (US); Charles Raymond Gingrich, III, Mechanicsburg, PA (US); Christopher G. Daily, Harrisburg, PA (US); Ronald Martin Weber, Annville, PA (US); Ricky Edward Brown, Lykens, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 191 days.

(21) Appl. No.: 12/367,044

(22) Filed: Feb. 6, 2009

(65) Prior Publication Data
US 2010/0201239 A1 Aug. 12, 2010

(51) Int. Cl.
*F21V 21/00* (2006.01)

(52) U.S. Cl. ............... 313/512; 362/217.12; 362/217.13; 362/217.16; 362/217.17

(58) Field of Classification Search .................. 313/498, 313/512; 362/225, 217.12, 217.13, 217.16, 362/217.17
See application file for complete search history.

(56) References Cited

U.S. PATENT DOCUMENTS

| | | | |
|---|---|---|---|
| 3,178,673 A | 4/1965 | Krehbiel | |
| 4,607,317 A * | 8/1986 | Lin | 362/249.08 |
| 4,618,205 A | 10/1986 | Freeman | |
| 5,904,415 A | 5/1999 | Robertson et al. | |
| 5,949,347 A | 9/1999 | Wu | |
| 6,283,612 B1 | 9/2001 | Hunter | |
| 6,582,103 B1 | 6/2003 | Popovich et al. | |
| 6,583,550 B2 | 6/2003 | Iwasa et al. | |
| 6,632,100 B1 | 10/2003 | Richardson | |
| 6,638,088 B1 | 10/2003 | Richardson | |
| 6,641,419 B1 | 11/2003 | Richardson | |
| 6,762,562 B2 | 7/2004 | Leong | |
| 6,773,130 B1 * | 8/2004 | Richardson | 362/92 |
| 6,853,151 B2 | 2/2005 | Leong et al. | |
| 6,860,628 B2 | 3/2005 | Robertson et al. | |
| 6,882,111 B2 * | 4/2005 | Kan et al. | 315/122 |
| 6,936,968 B2 | 8/2005 | Cross et al. | |

(Continued)

FOREIGN PATENT DOCUMENTS

CN 201 014 273 1/2008

(Continued)

OTHER PUBLICATIONS

EverLED-TR™; Drop-In Flouorescent Tube Replacement Featuring LED Technology, LEDdynamics, Inc., 2008, 2 pgs.

(Continued)

*Primary Examiner* — Nimeshkumar Patel
*Assistant Examiner* — Christopher Raabe

(57) ABSTRACT

An end cap assembly for a light tube that has a circuit board with one or more solid state lighting devices mounted thereto and a lens covering the circuit board includes an end cap body having a lens engagement surface configured to engage the lens and an external mating interface configured to mate with a socket connector of a fixture. An end cap connector extends from the end cap body. The end cap connector holds contacts having first mating portions configured to be electrically connected to the circuit board and second mating portions configured to be electrically connected to the socket connector.

23 Claims, 17 Drawing Sheets

U.S. PATENT DOCUMENTS

| | | | |
|---|---|---|---|
| 6,997,576 B1 * | 2/2006 | Lodhie et al. | 362/240 |
| 7,049,761 B2 | 5/2006 | Timmermans et al. | |
| 7,052,171 B1 | 5/2006 | Lefebvre et al. | |
| 7,114,830 B2 | 10/2006 | Robertson et al. | |
| 7,307,391 B2 | 12/2007 | Shan | |
| 7,347,706 B1 | 3/2008 | Wu et al. | |
| 7,611,260 B1 * | 11/2009 | Lin et al. | 362/224 |
| 8,021,192 B2 * | 9/2011 | Takata | 439/628 |
| 2004/0012972 A1 | 1/2004 | Wu | |
| 2004/0189218 A1 * | 9/2004 | Leong et al. | 315/291 |
| 2007/0133202 A1 | 6/2007 | Huang et al. | |
| 2008/0062680 A1 | 3/2008 | Timmermans et al. | |
| 2009/0036002 A1 | 2/2009 | Arai | |
| 2009/0244925 A1 * | 10/2009 | Snagel et al. | 362/648 |
| 2011/0235320 A1 * | 9/2011 | Cai et al. | 362/217.17 |

FOREIGN PATENT DOCUMENTS

| | | |
|---|---|---|
| EP | 1 672 277 | 6/2006 |
| EP | 1 852 648 | 11/2007 |
| EP | 2 194 315 | 6/2010 |
| GB | 2 451 551 | 2/2009 |

OTHER PUBLICATIONS

Ilumisys Solid State Lighting Products, Altair Engineering, Inc., 2008, 1 pg.

ReLEDSYSTEMS.the future of solid-state lighting, ReLED Systems, 2008, 2 pgs.

EVER-LED TR, Enjoying the benefits of LED technology is as easy as replacing the tube in your fluorescent light fixture, LEDdynamics, Inc., 2007, 1 pg.

European Search Report, European Application No. 10152324.9 European Filing Date May 20, 2010.

International Search Report, International Application No. PCT/US2010/001705, International Filing Date Jun. 15, 2010.

* cited by examiner

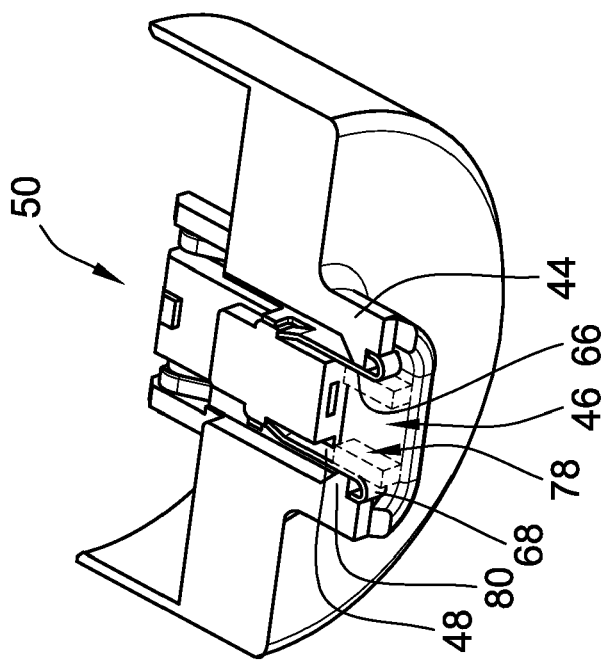
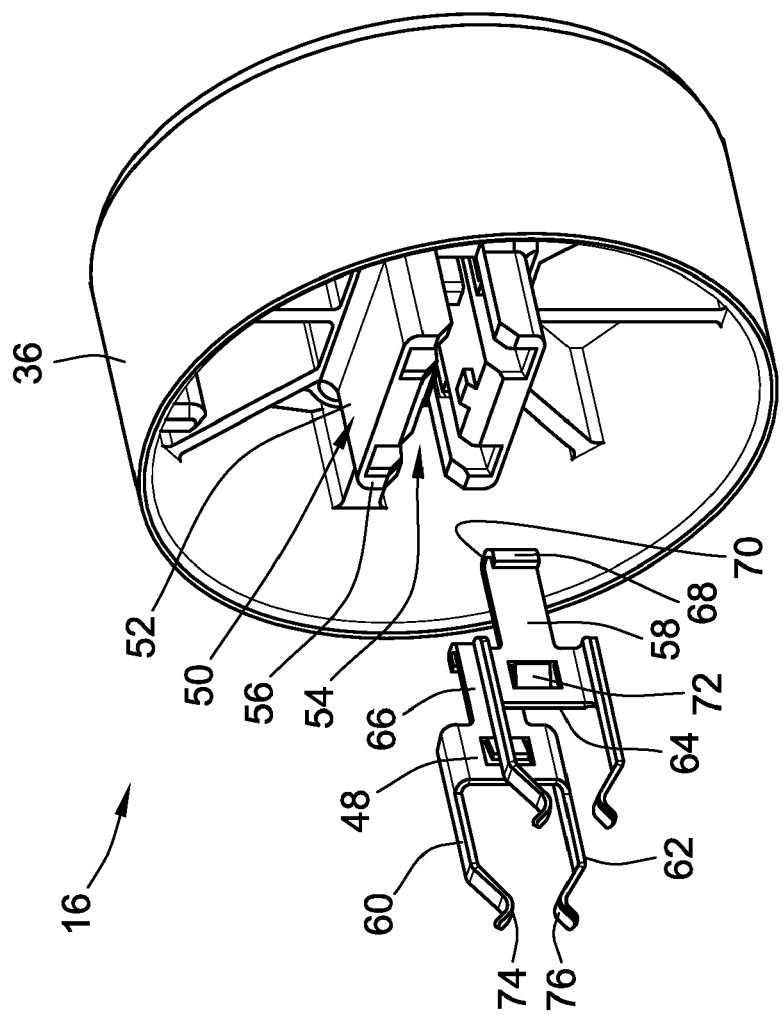

END CAP ASSEMBLY FOR A LIGHT TUBE

BACKGROUND OF THE INVENTION

The subject matter herein relates generally to lighting assemblies, and more particularly, to an end cap assembly for a light tube.

Solid state light sources, such as light-emitting diodes ("LEDs"), organic light emitting devices or other solid state sources, are now widely applied in a variety of lighting applications. The relatively high efficacy of LEDs (in lumens per watt) is the primary reason for their popularity. Power savings and extended lamp life are possible when LEDs are used to replace traditional fluorescent lighting. Solid state light tubes are in use to replace traditional fluorescent bulbs. The solid state light tubes are typically assembled into a light tube having a circuit board with a plurality of LEDs or other solid state light sources electrically connected thereto. The light tube may or may not include a thermal dissipation device. The light tube may be linear or some other shape, such as circular, U-shaped and the like. A lens generally covers the circuit board and LEDs to direct the light in a pattern as dictated by the end application. The light tubes are sized and shaped generally the same as traditional fluorescent bulbs.

Solid state light tubes are typically designed into fixtures specifically designed to take advantage of the solid state light tubes. However, a large number of traditional fluorescent fixtures are currently in use. Replacement of these fixtures with specifically designed solid state lighting fixtures may be impractical or cost prohibitive for some people. As a result, some solid state lighting assemblies have been designed to retrofit into traditional fluorescent lamp fixtures with minimal modifications necessary.

Problems arise in retrofitting the solid state light tubes to fit into traditional fluorescent lamps. For example, the electrical connection between the circuit board and the traditional dual-pins that comprise the electrical contacts of a fluorescent tube may be complex and expensive to manufacture. Typically, a dual-pin contact cap of a conventional fluorescent bulb is provided at the end of the light tube, and if electrically connected to the circuit board by wires that are soldered to the circuit board. Manufacturing solid state light tubes in this manner is time-consuming, expensive and difficult.

A need remains for solid state light tube components that facilitate cost-effective and reliable mass production manufacturing. Further, a need remains for solid state light tube components that allow the solid state light tube to retrofit into traditional fluorescent lamp fixtures in a simple and cost-effective manner.

BRIEF DESCRIPTION OF THE INVENTION

In one embodiment, an end cap assembly is provided for a light tube that has a circuit board with one or more solid state lighting devices mounted thereto and a lens covering the circuit board. The end cap assembly includes an end cap body having a lens engagement surface configured to engage the lens and an external mating interface configured to mate with a socket connector of a fixture. An end cap connector extends from the end cap body. The end cap connector holds contacts having first mating portions configured to be electrically connected to the internal circuit board and second mating portions configured to be electrically connected to the external socket connector.

Optionally, the end cap connector may have a connector body holding the contacts. The connector body may either be formed integral with the end cap body or be separately provided from and coupled to the end cap body. The end cap body may include an inner end and an outer end, where the inner end faces the light tube and the outer end faces the socket connector. Optionally, the end cap body may have a nipple extending outward from the outer end, where the nipple has a chamber configured to receive a portion of the socket connector and the contacts are exposed within the chamber. The outer end may be generally planar with the contacts defining pins extending outward from the outer end for interfacing with the socket connector. The contacts may be separable from the circuit board by removing the end cap body from the light tube.

Optionally, the end cap connector may include a connector body mounted to the circuit board such that the contacts are aligned with contact pads on the circuit board. The contacts may be soldered to the contact pads or may be connected using a pressure connection. A securing feature may engage the circuit board to hold the connector body in position relative to the circuit board. The end cap body may be separately provided from the connector body and may be coupled to at least one of the connector body and the contacts to secure the end cap body relative to the end cap connector.

In another embodiment, a lighting system is provided for connecting a solid state light tube to more than one type of socket connector where each type of socket connector has a different mating interface. The light tube has a circuit board with one or more solid state lighting devices mounted thereto and a lens covering the circuit board. The lighting system includes first and second end cap assemblies each having an end cap body having a lens engagement surface configured to engage the lens. Each of the first and second end cap assemblies have an end cap connector extending from the end cap body that holds contacts configured to be electrically connected to the circuit board and to the corresponding socket connector. The end cap body of the first end cap assembly defines a first mating interface configured to mate with a first type of socket connector and the end cap body of the second end cap assembly defines a second meeting interface configured to mate with a second type of socket conductor.

In a further embodiment, a lighting system is provided including a solid state light tube having a circuit board with a plurality of solid state lighting devices electrically connected thereto and a lens covering the circuit board. The lens extends at least partially circumferentially around the circuit board. An end cap assembly is mounted to the light tube. The end cap assembly has an end cap body engaging the lens and a mating interface configured to mate with a socket connector of a fixture. The end cap assembly also includes an end cap connector extending from the end cap body that holds contacts having first mating portions configured to be electrically connected to the circuit board and second mating portions configured to be electrically connected to the socket connector.

BRIEF DESCRIPTION OF THE DRAWINGS

FIG. 3 is an exploded view of the end cap assembly shown in FIG. 2.

FIG. 4 is a cross-sectional view of a portion of the end cap assembly shown in FIG. 2.

DETAILED DESCRIPTION OF THE INVENTION

Figure 1:
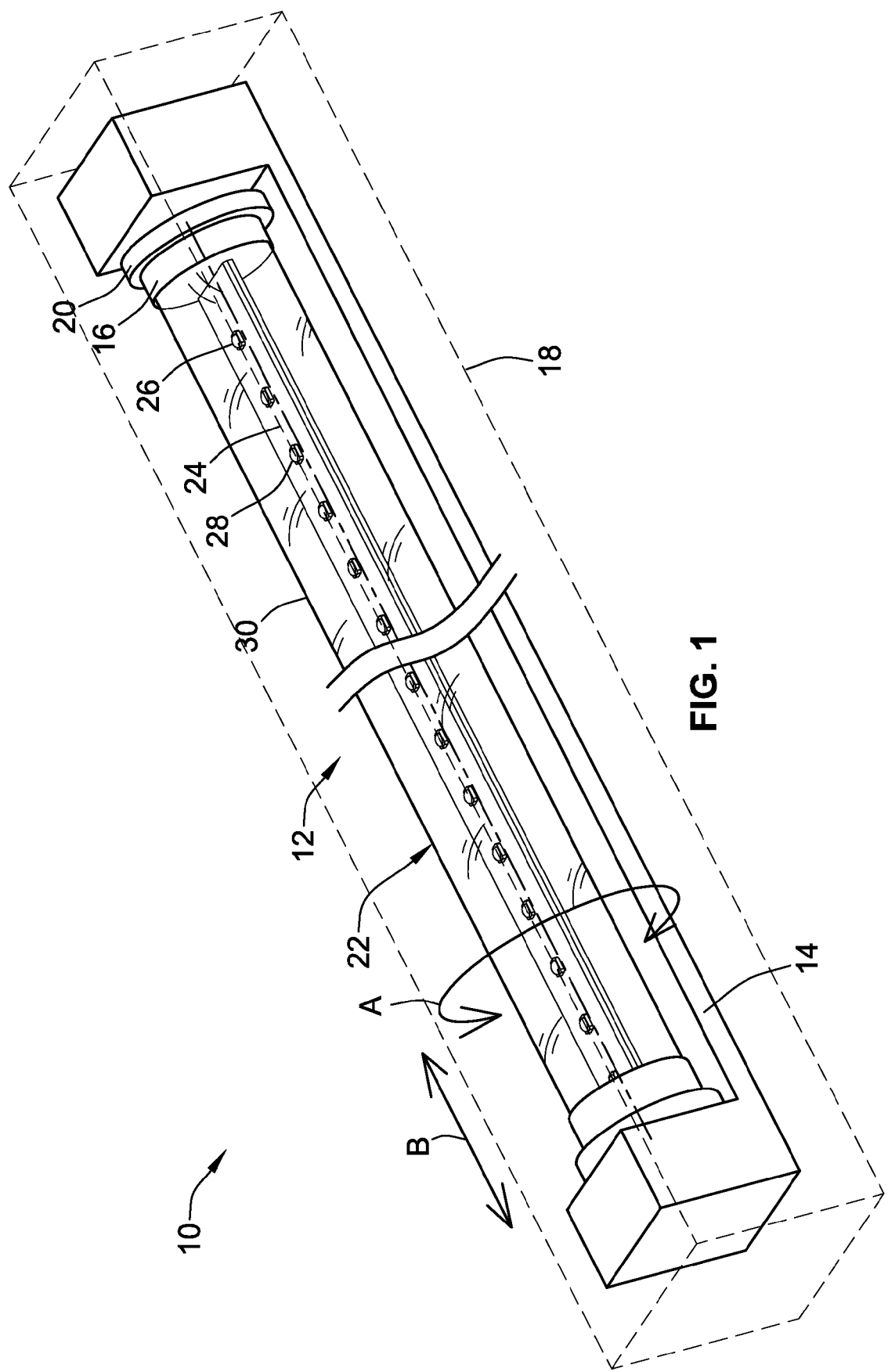
FIG. 1 illustrates a lighting system utilizing solid state light tubes that is assembled into a fluorescent lamp fixture using end cap assemblies formed in accordance with an exemplary embodiment.

FIG. 1 illustrates a lighting system 10 utilizing a solid state light tube 12 that is assembled into a ballast 14 using end cap assemblies 16 formed in accordance with an exemplary embodiment. In an exemplary embodiment, the ballast 14, only a portion of which is illustrated in FIG. 1, may be traditional fluorescent lamp ballast that is used in a fluorescent lamp fixture 18 (represented schematically in phantom in FIG. 1). The ballast 14 receives power in from a traditional power supply, such as a line voltage from a building, and provides power to the light tube 12. The light tube 12 may be connected to socket connectors 20 of the ballast 14 in a traditional manner, such as by rotating the end cap assemblies 16 into the socket connectors 20, as shown by arrow A, or by inserting the end cap assemblies 16 linearly into the socket connectors 20, as shown by the arrow B, depending on the particular socket connector 20 type.

The light tube 12 extends between the end cap assemblies 16. The light tube 12 includes one or more circuit boards 24 extending along a longitudinal axis 26 of the light tube 12. A plurality of solid state lighting devices 28 are electrically connected to the circuit board 24 and are arranged in a predetermined pattern to emit light from the light tube 12. In an exemplary embodiment, the lighting devices 28 are represented by light emitting diodes (LEDs) and may be referred to hereinafter as LEDs 28. Any number of LEDs 28 may be provided on the circuit board 24.

A lens 30 covers at least a portion of the circuit board 24 and the LEDs 28. The lens 30 may extend at least partially circumferentially around the circuit board 24 and the LEDs 28. In the illustrated embodiment, the lens 30 extends entirely circumferentially around the circuit board 24 and the LEDs 28 to define a closed tube. In an alternative embodiment, the lens 30 may extend only partially circumferentially around the circuit board 24 and the LEDs 28 to define an open tube. Optionally, the lens 30 may be provided outward from the circuit board 24 and the LEDs 28 in the direction in which light is intended to be illuminated. For example, if light is illuminated from half of the light tube 12 (for example, approximately 180°), then the lens 30 need only extend along half of the light tube 12 (for example, approximately 180°).

The circuit board 24 is electrically connected to either one or both of the end cap assemblies 16. Power is provided from the socket connectors 20 to the circuit board 24 by the end cap assemblies 16. The power is transmitted along the circuit board 24 to the LEDs 28.

Figure 2:
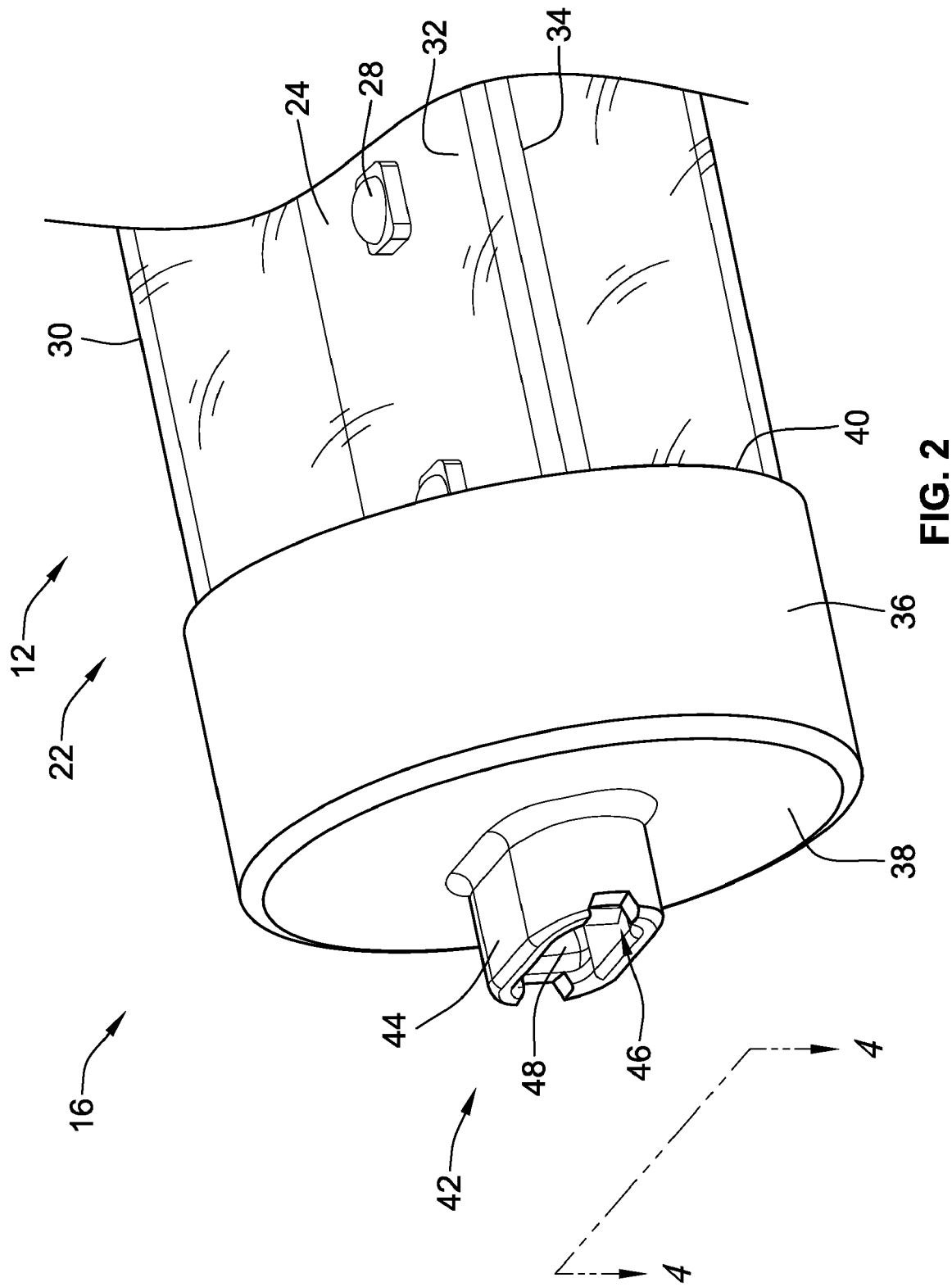
FIG. 2 is a perspective view of a portion of the light tube and end cap assembly shown in FIG. 1.

FIG. 2 is a perspective view of a portion of the light tube 12 and end cap assembly 16. The light tube 12 includes the circuit boards 24 with the LEDs 28 mounted thereto. The circuit boards 24 are arranged back-to-back to define an upper circuit board 32 and a lower circuit board 34. LEDs 28 are mounted to the outer surfaces of both the upper and lower circuit boards 32, 34. Light is emitted outward (for example, approximately 180°) from both circuit boards 32, 34. In an alternative embodiment, only one circuit board 24 is provided with LEDs 28 mounted on both sides thereof. The lens 30 extends entirely circumferentially around the circuit boards 24 and the LEDs 28. The lens 30 has a generally circular cross-section and a tubular shape along a length of the lens 30.

The end cap assembly 16 is mounted to the end of the light tube 12. The end cap assembly provides the electrical interface between the socket connector 20 (shown in FIG. 1) and the circuit boards 24 and LEDs 28 of the light tube 12. The end cap assembly 16 may be picked and placed into position on the light tube 12 such that the end cap assembly 16 may be electrically connected to the circuit boards 24. As such, the end cap assembly 16 may be connected to the light tube by an automated assembly process, which may decrease the overall assembly time. The end cap assembly 16 does not hand solder wires to connect the end cap assembly 16 to the circuit boards 24. Additionally, the end cap assembly 16 does not use adhesives or potting compound. Rather, a rigid connector structure mates with and engages the circuit boards 24. Different end cap assemblies having different geometries or designs, such as different mating interfaces, may be coupled to the end of the light tube 12 to provide a particular mating interface for mating with a particular socket connector 20.

The end cap assembly 16 has an end cap body 36 extending between an outer end 38 and an inner end 40. The end cap body 36 defines a mating interface 42 at the outer end 38 thereof. The mating interface 42 is configured for mating with one of the socket connectors 20 (shown in FIG. 1). Optionally, the mating interface 42 may be an industry standard mating interface for a traditional fluorescent lamp fixture. In the illustrated embodiment, the mating interface 42 is configured for mating with a recessed double contact base type of socket connector, such as an R17d type of socket connector.

The end cap body 36 includes a nipple 44 extending outward from the outer end 38 thereof. The nipple 44 has an oval-shape and is elongated in a direction that is parallel to the interface of the circuit boards 24. The nipple 44 has a chamber 46 that is configured to receive a portion of the socket connector 20. A pair of contacts 48 are exposed within the chamber 46 for engagement with mating contacts of the socket connector 20. The contacts 48 are electrically connected to the circuit boards 24, as will be described in further detail below.

FIG. 3 is an exploded view of the end cap assembly 16. The end cap assembly 16 includes the end cap body 36 and an end cap connector 50 extending from a portion of the end cap body 36. The connector 50 includes a connector body 52 that holds the contacts 48. The contacts 48 are received in channels 54 in the connector 50 and loaded through a rear end 56 of the connector body 52. Optionally, the connector 50 may be substantially centered with respect to the end cap body 36.

In the illustrated embodiment, the connector body 52 is formed integrally with the end cap body 36. For example, the connector body 52 and the end cap body 36 may be molded simultaneously as part of a common mold. The connector body 52 may be aligned with and/or formed integral with the nipple 44 (shown in FIG. 2). Optionally, the nipple 44 may be a part of the connector body 52 as opposed to, or in addition to, the end cap body 36. The contacts 48 extend into the chamber 46 (shown in FIG. 2) of the nipple 44 from the connector body 52. In an alternative embodiment, the connector 50 may be separately formed from, and coupled to, the end cap body 36.

The contacts 48 include a contact body 58 having upper and lower arms 60, 62 extending from a rear 64 of the contact body 58. The arms 60, 62 have mating portions 74, 76, respectively. The mating portions 74, 76 are configured to engage the upper and lower circuit boards 32, 34 (shown in FIG. 2) respectively. The contact body 58 includes an inner surface 66 and a hook portion 68 at a front end 70 of the contact body 58. A latch 72 extends inward from the contact body 58. The latch 72 is configured to engage a portion of the connector body 52 when the contacts 48 are loaded in the channels 54. The latch 72 holds the contact 48 in the channel 54.

FIG. 4 is a cross-sectional view of a portion of the nipple 44 and the contacts 48 of the end cap assembly 16 taken along line 2-2 shown in FIG. 2. The contacts 48 extend into the chamber 46 such that the inner surfaces 66 are exposed within the chamber 46. The inner surfaces 66 are configured to engage mating contacts 78 (shown in phantom) of the socket connector 20 (shown in FIG. 1). The nipple 44 includes protrusions 80 that extend into the chamber 46. The hook portions 68 of the contacts 48 wrap around the protrusions 80. The hook portions 68 may engage the protrusions 80 to resist removal of the contacts 48 from the chamber 46 and/or the connector 50.

Figure 5:
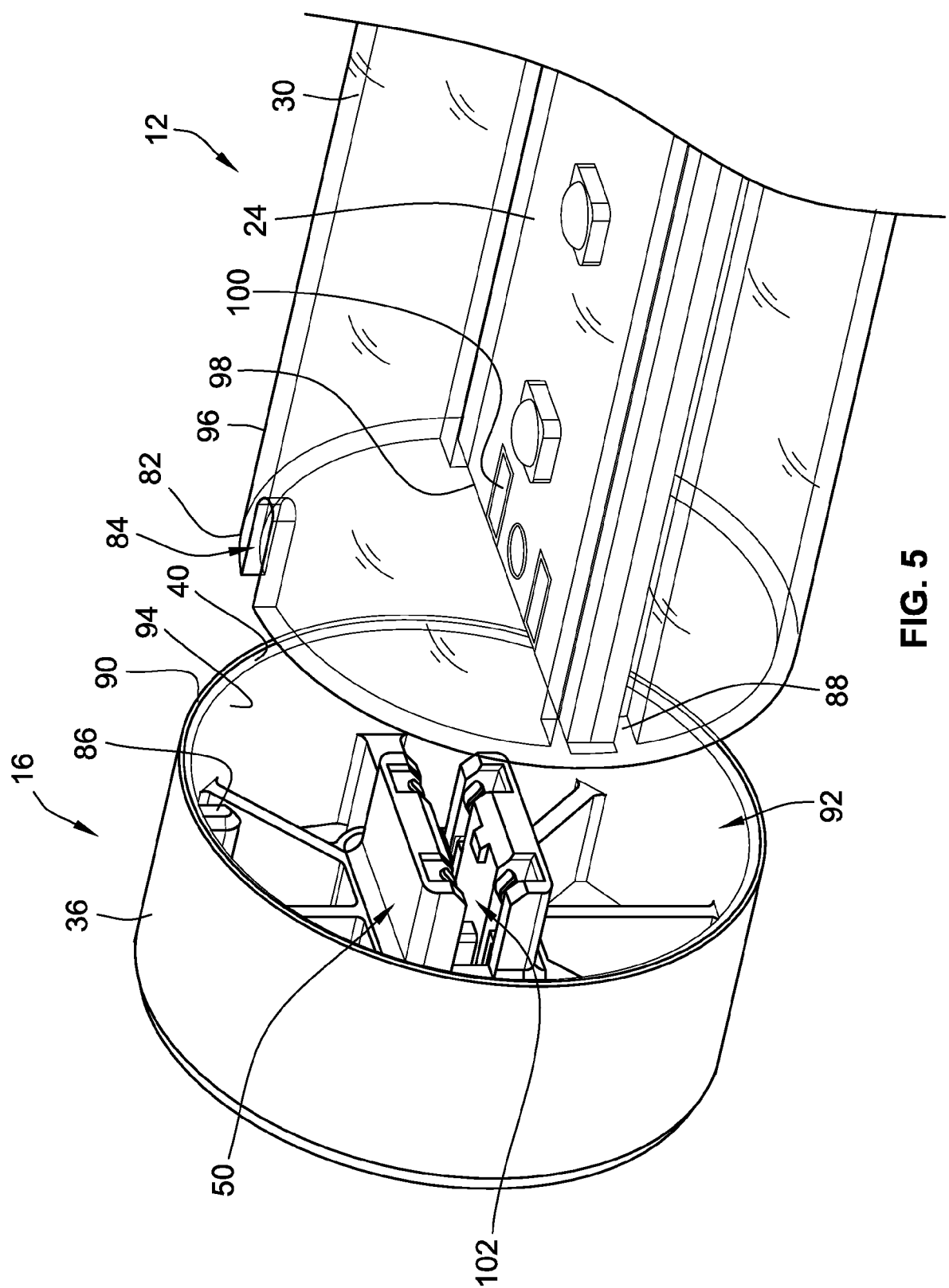
FIG. 5 is an exploded rear perspective view of the light tube and end cap assembly shown in FIG. 2.

FIG. 5 is an exploded rear perspective view of the light tube 12 and end cap assembly 16. The lens 30 extends to a front end 82. The lens 30 includes an alignment feature 84 that cooperates with an alignment feature 86 of the end cap assembly 16 to align the end cap assembly 16 with respect to the light tube 12. The alignment features 84, 86 may provide anti-torque to resist twisting of the end cap assembly 16 during mating with the socket connector 20. In the illustrated embodiment, the alignment feature 84 is represented by a slot formed in the lens 30 that is open and the front end 82. The alignment feature 86 is represented by a tab extending inward from the end cap body 36. The lens 30 includes rails 88 extending along the length of the lens 30 that hold the circuit boards 24 in place within the interior of the lens 30. In an exemplary embodiment, the lens 30 is an extruded plastic component that is transparent or semi transparent such that light can be emitted therethrough. The rails 88 may be coextruded with the rest of the lens 30.

The end cap body 36 includes a lip 90 formed at the inner end 40. The lip 90 circumferentially surrounds a cavity 92 that receives a portion of light tube 12 therein. As such, the lip 90 surrounds at least a portion of the light tube 12. The end cap body 36 includes a lens engagement surface 94 on an interior portion of the lip 90. When assembled, the lens engagement surface 94 engages an outer surface 96 of the lens 30.

The circuit boards 24 extend to an edge 98 that is positioned proximate to, or at, the front end 82 of the lens 30. Contact pads 100 are provided proximate to, or at, the edge 98 of the circuit boards 24. The connector 50 includes a slot 102 formed in the rear end 56 that receives the circuit boards 24. When the card edges 98 of the circuit boards 24 are received in the slot 102, the contacts 48 engage the contact pads 100. An electrical circuit is created between the contacts 48 and the circuit boards 24 via the contact pads 100.

Figure 6:
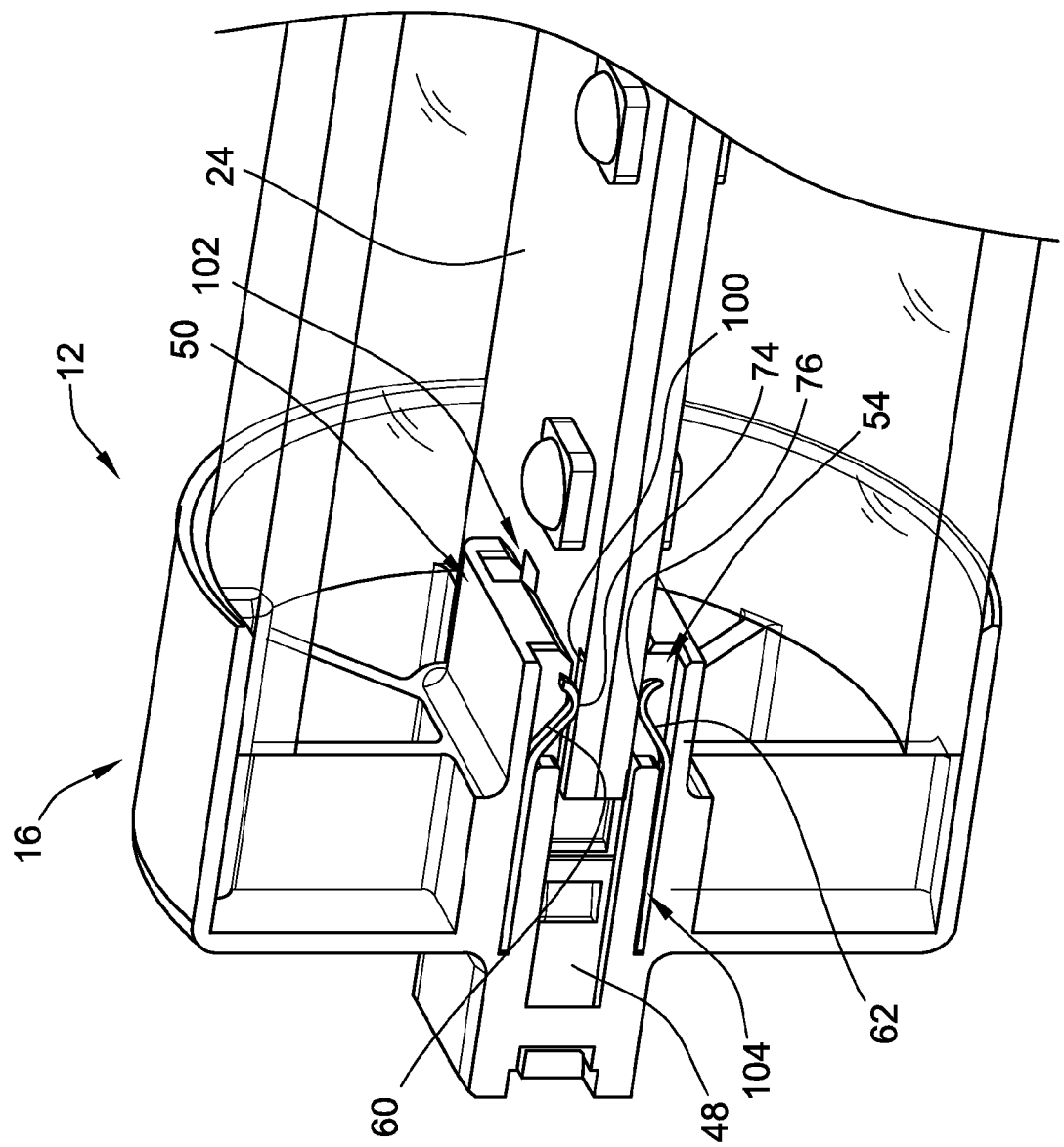
FIG. 6 is a partial sectional view of the light tube and the end cap assembly shown in FIG. 5 in an assembled state.

FIG. 6 is a partial sectional view of the light tube 12 and the end cap assembly 16 in an assembled state. The circuit boards 24 are received in the slot 102 of the connector 50. The contacts 48 engage the contact pads 100. Power transmitted along the contacts 48 is transmitted to the circuit boards 24 via the contact pads 100.

The contacts 48 are received in the channels 54 such that the arms 60, 62 are held in grooves 104 defined by the connector body 52. The ends of the arms 60, 62 extend from the grooves 104 to engage with the circuit boards 24. The mating portions 74, 76 engage the contact pads 100. The arms 60, 62 may be at least partially deflected when mated with the circuit boards 24. The arms 60, 62 act as spring beams that provide an engagement force in the direction of the contact pads 100 to maintain contact between the arms 60, 62 and the contact pads 100. Mating portions 74, 76 are releasably coupled to the contact pads 100 such that the mating portions 74, 76 may be disengaged from the contact pads 100 when the end cap assembly 16 is removed from the light tube 12. Alternatively, the mating portions 74, 76 may be permanently secured to the contact pads 100 such as by soldering the mating portions 74, 76 to the contact pads 100.

Figure 7:
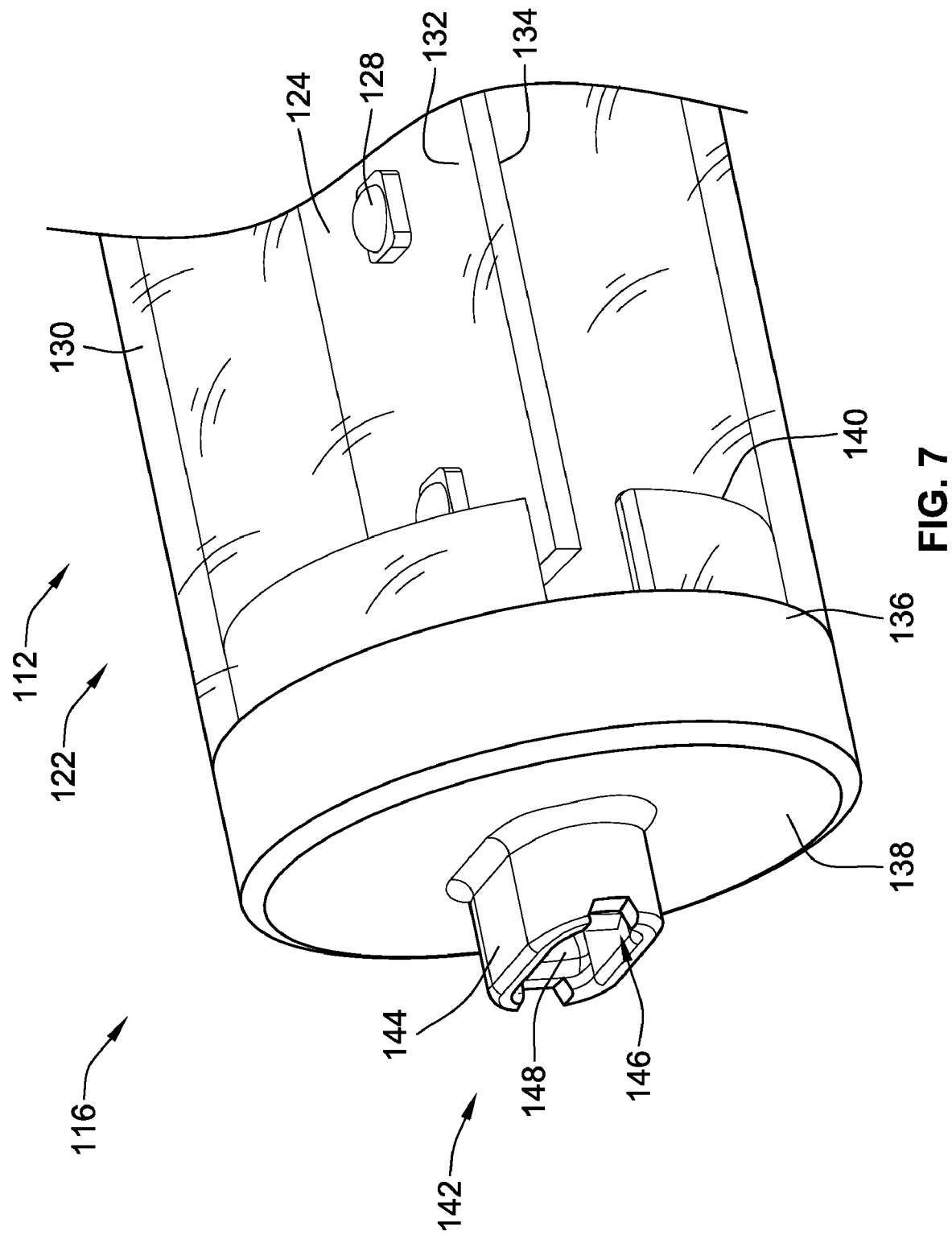
FIG. 7 is a perspective view of a portion of an alternative light tube and end cap assembly for use in the lighting system shown in FIG. 1.

FIG. 7 is a perspective view of a portion of an alternative solid state light tube 112 and end cap assembly 116 for use in the lighting system 10 (shown in FIG. 1). The light tube 112 has one or more circuit boards 124 with LEDs 128 mounted thereto. A lens 130 at least partially circumferentially surrounds the circuit board(s) 124 and the LEDs 128. The circuit board(s) 124 are arranged as a single layer within the light tube 112 and include an inner surface 132 and an outer surface 134. The LEDs 128 are mounted to the outer surface 134 and light is emitted outward (for example, approximately 180°) from the outer surface 134. In the illustrated embodiment, no LEDs 128 are mounted to the inner surface 132, and light is not emitted outward from the inner surface 132. The lens 130 has a generally circular cross-section and a tubular shape along a length of the lens 130. Alternatively, the lens 130 may extend only partially around the circuit board 124 and the LEDs 128 (for example, approximately 180°), such that the light tube 112 has a semicircular cross-section.

The end cap assembly 116 is mounted to the end of the light tube 112. The end cap assembly 116 has an end cap body 136 extending between an outer end 138 and an inner end 140. The end cap body 136 defines a mating interface 142 at the outer end 138 thereof. The mating interface 142 is configured for mating with one of the socket connectors 20 (shown in FIG. 1). Optionally, the mating interface 142 may be substantially similar to the mating interface 42 (shown in FIG. 2).

The end cap body 136 includes a nipple 144 extending outward from the outer end 138 thereof. The nipple 144 has a chamber 146 that is configured to receive a portion of the socket connector 20. A pair of contacts 148 are exposed within the chamber 146 for engagement with mating contacts of the socket connector 20. The contacts 148 are electrically connected to the circuit board 124.

Figure 8:
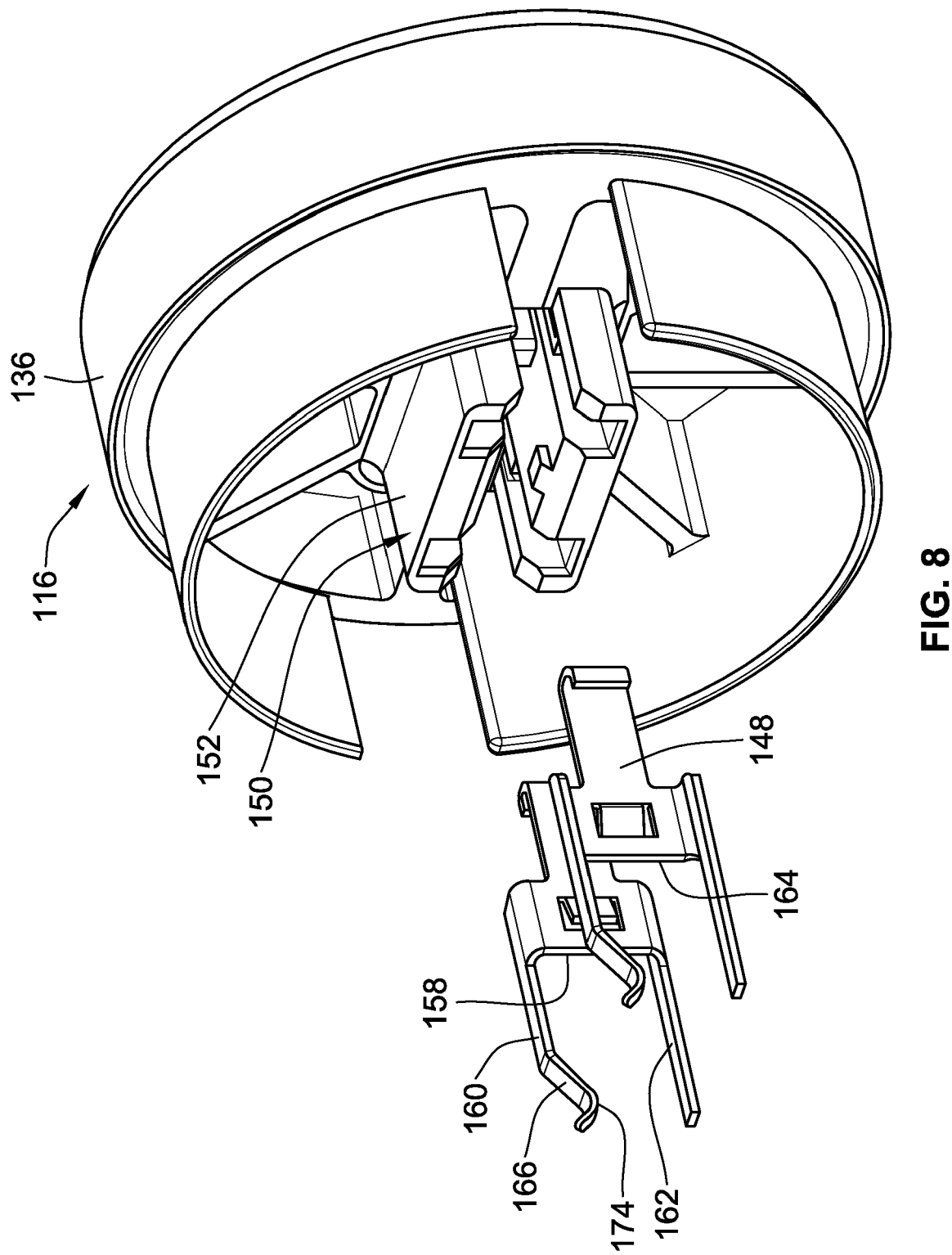
FIG. 8 is an exploded view of the end cap assembly shown in FIG. 7.

FIG. 8 is an exploded view of the end cap assembly 116. The end cap assembly 116 includes the end cap body 136 and an end cap connector 150 extending from a portion of the end cap body 136. The connector 150 includes a connector body 152 that holds the contacts 148. In the illustrated embodiment, the connector body 152 is formed integrally with the end cap body 136. In an alternative embodiment, the connector 150 may be separately formed from, and coupled to, the end cap body 136.

The contacts 148 include a contact body 158 having upper and lower arms 160, 162 extending from a rear 164 of the contact body 158. The upper arm 160 has an angled portion 166 that is angled towards the lower arm 162. The upper arm 160 has a mating portion 174 configured to engage the circuit board 124. The lower arm 162 is flat.

Figure 9:
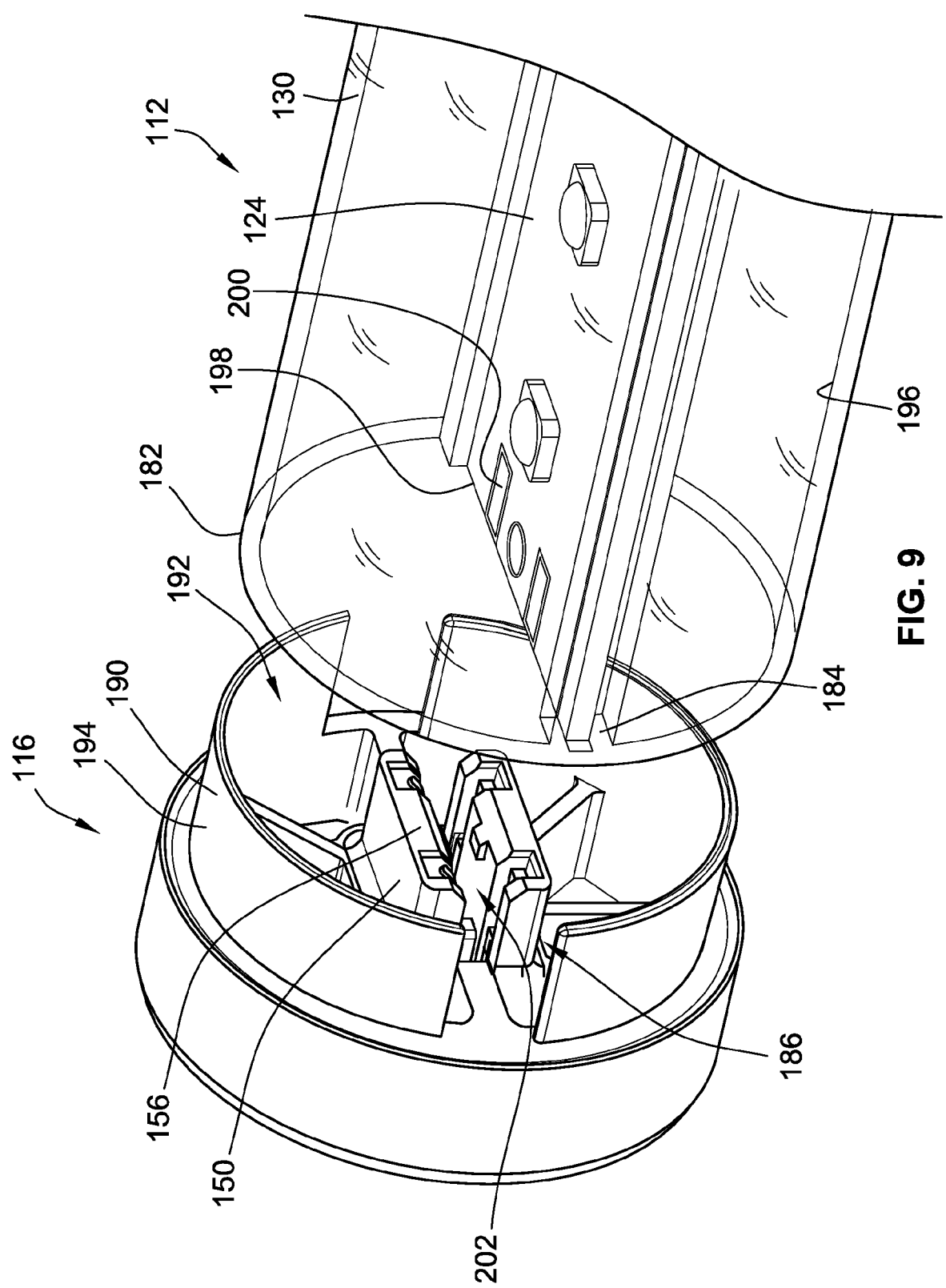
FIG. 9 is an exploded rear perspective view of the light tube and end cap assembly shown in FIG. 7.

FIG. 9 is an exploded rear perspective view of the light tube 112 and the end cap assembly 116. The lens 130 extends to a front end 182. The lens 130 includes an alignment feature 184 that cooperates with an alignment feature 186 of the end cap assembly 116 to align the end cap assembly 116 with respect to the light tube 112. In the illustrated embodiment, the alignment feature 184 is represented by rails of the lens 130 that hold the circuit board 124 and that are off-center or oriented to cooperate with the alignment feature 186 in only one orientation. The alignment feature 186 is represented by openings formed in the connector body 152.

The end cap body 136 includes a lip 190 formed at the inner end 140. The lip 190 circumferentially surrounds a cavity 192 that receives a portion of light tube 112 therein. The end cap body 136 includes a lens engagement surface 194 on an exterior portion of the lip 190. When assembled, the lens engagement surface 194 engages an inner surface 196 of the lens 130.

The circuit board 124 extends to an edge 198 that is positioned proximate to, or at the front end 182 of the lens 130. Contact pads 200 are provided proximate to, or at, the edge 198 of the circuit board 124. The connector 150 includes a slot 202 formed in the rear end 156 that receives the circuit board 124. When the card edge 198 of the circuit board 124 is received in the slot 202, the contacts 148 engage the contact pads 200. An electrical circuit is created between the contacts 148 and the circuit board 124 via the contact pads 200.

Figure 10:
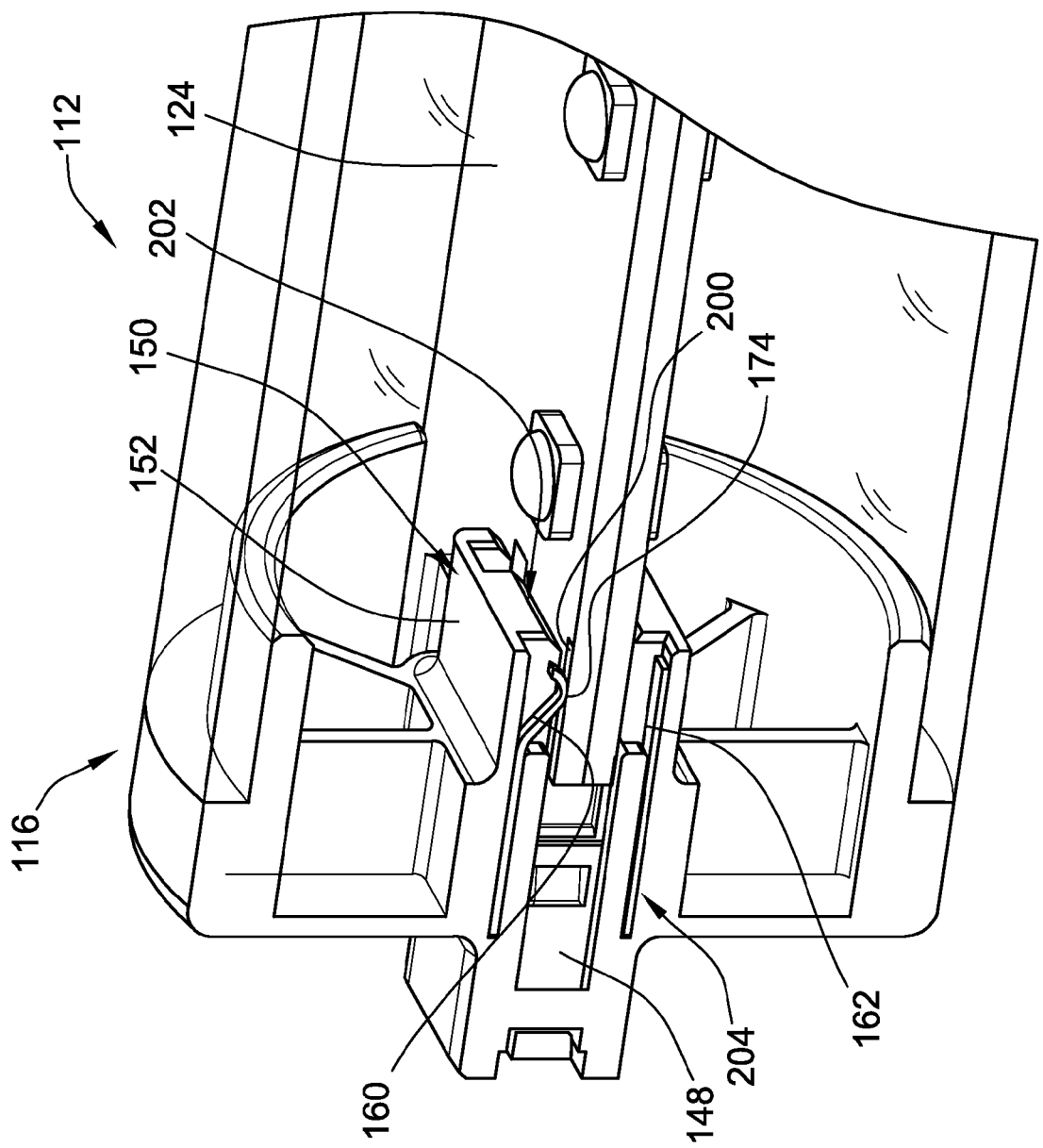
FIG. 10 is a partial sectional view of the light tube and the end cap assembly shown in FIG. 9 in and assembled state.

FIG. 10 is a partial sectional view of the light tube 112 and the end cap assembly 116 in an assembled state. The circuit board 124 is received in the slot 202 of the connector 150. The contacts 148 engage the contact pads 200. Power transmitted along the contacts 148 is transmitted to the circuit board 124 via the contact pads 200.

The contacts 148 are received in the connector 150 such that the arms 160, 162 are held in grooves 204 defined by the connector body 152. The ends of the upper arms 160 extend from the grooves 204 to engage the circuit board 124. The mating portions 174 engage the contact pads 200. The arms 160 act as spring beams that provide an engagement force in the direction of the contact pads 200 to maintain contact between the arms 160 and the contact pads 200. The lower arms 162 provide leverage to hold the contacts 148 within the connector 150.

Figure 11:
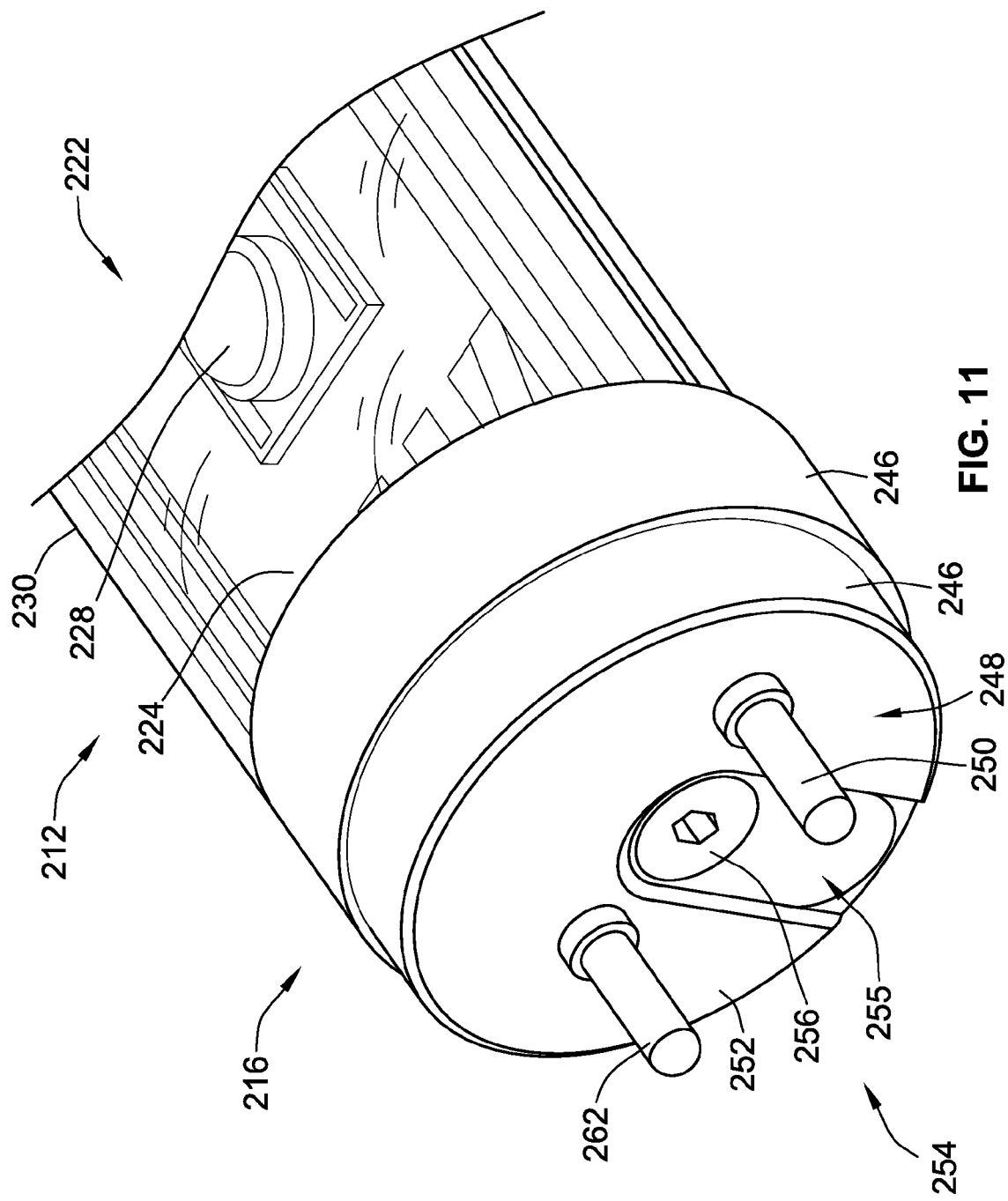
FIG. 11 illustrates an alternative light tube and end cap assembly for an alternative lighting system utilizing a fluorescent lamp configuration that differs from the fluorescent lamp fixture illustrated in FIG. 1.
Figure 12:
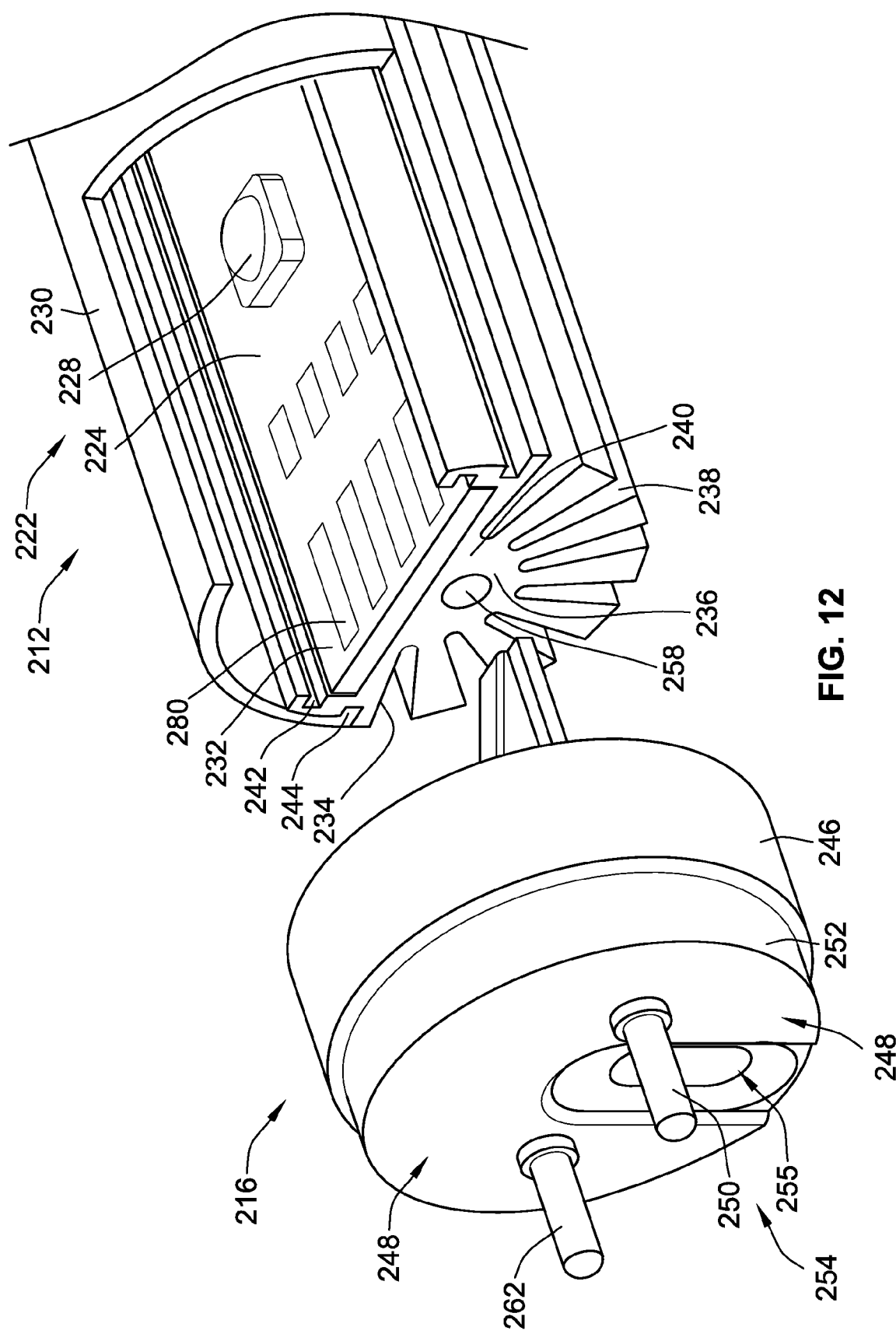
FIG. 12 is an exploded perspective view of the light tube and end cap assembly shown on FIG. 11.

FIG. 11 illustrates, an alternative solid state light tube 212 and end cap assembly 216 for an alternative lighting system utilizing a socket connector that differs from the socket connector 20 illustrated in FIG. 1. For example, the light tube 212 and end cap assembly 216 may be utilized with a bi-pin type socket connector of a fluorescent lamp ballast, such as a G13 type socket connector. FIG. 12 is an exploded perspective view of the light tube 212 and end cap assembly 216.

The light tube 212 has one or more circuit boards 224 with LEDs 228 mounted thereto. A lens 230 at least partially circumferentially surrounds the circuit boards 224 and the LEDs 228. The circuit board(s) 224 are arranged as a single layer within the light tube 212 and include an inner surface 232 and an outer surface 234. The LEDs 228 are mounted to the outer surface 234 and light is emitted outward (for example, approximately 180°) from the outer surface 234. In the illustrated embodiment, no LEDs 228 are mounted to the inner surface 232, and light is not emitted outward from the inner surface 232.

The light tube 212 includes a heatsink 236. The heatsink 236 extends along the inner surface 232 of the circuit board 224. Heat generated by the circuit board 224 and/or the LEDs 228 is transferred to the heatsink 236 and dissipated therefrom. The heatsink 236 includes a plurality of fins 238 that extend radially outward from a central portion 240 of the heatsink 236. The heatsink 236 includes rails 242 that hold the lens 230 and rails 244 that hold the end cap assembly 216. The light tube 212 has a generally circular cross-section and a tubular shape along a length thereof defined by the lens 230 and the outer perimeter of the heatsink 236. The lens 230 extends only partially circumferentially around the circuit board 224 and the LEDs 228 (for example, approximately 180°), and the heatsink 236 extends only partially circumferentially around the circuit board 224 (for example, approximately 180°).

The end cap assembly 216 is mounted to the end of the light tube 212. The end cap assembly 216 has an end cap body 246 and an end cap connector 248 extending therefrom. The connector 248 includes a pair of contacts 250 that are configured to electrically connect with mating contacts of the socket connector and with the circuit board 224. In the illustrated embodiment, the contacts 250 define pins 262 having circular cross-sections at the socket mating portion of the contacts 250. The pins are configured to be coupled with a bi-pin type socket connector, such as those typical of a fluorescent lamp fixture.

The connector 248 includes a connector body 252 that holds the contacts 250. The connector body 252 is formed integrally with the end cap body 246. In an alternative embodiment, the connector body 252 may be separately formed from, and coupled to, the end cap body 246.

The end-cap assembly 216 defines a mating interface 254 configured for mating with one of the socket connectors. In the illustrated embodiment, the mating interface 254 is defined by mating portions of the contacts 250 and the outer end of the end cap body 246 and/or the connector body 252. The outer end of the end cap body 246 and/or the connector body 252 is substantially flat and planar. The contacts 250 extend outward from the outer end of the end cap body 246 and/or the connector body 252.

A mounting opening 255 extends through the end cap body 246 and/or the connector body 252. The mounting opening 255 receives a fastener 256 for securing the end cap assembly 216 to the light tube 212. The fastener 256 may be threadably coupled to a threaded opening 258 in the heatsink 236.

Figure 13:
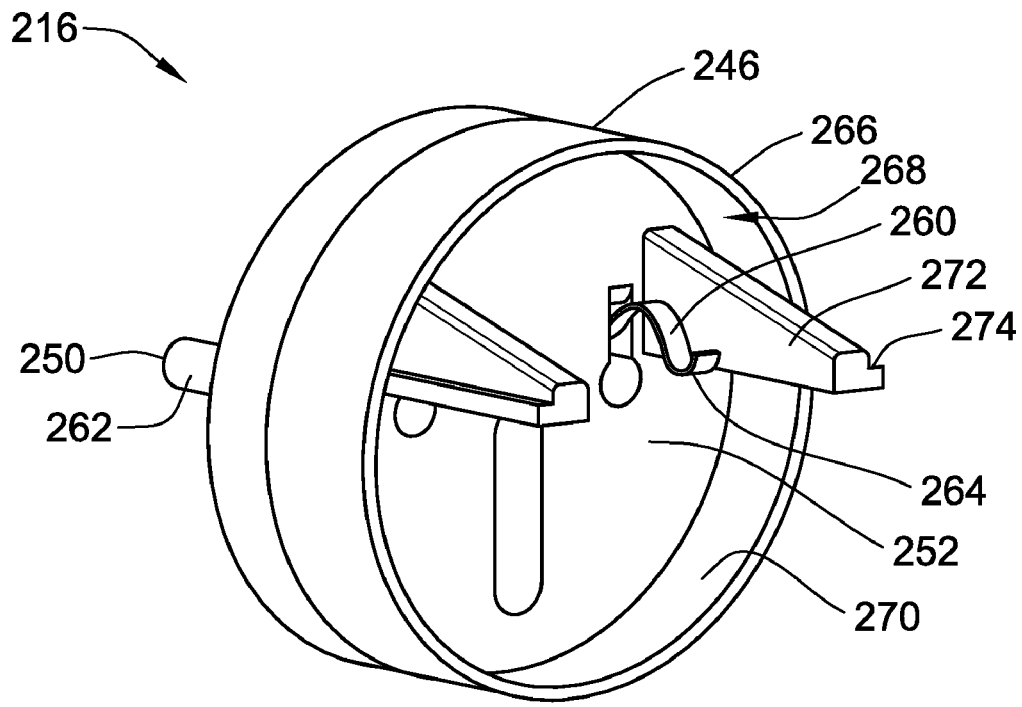
FIG. 13 is a rear perspective view of the end cap assembly shown in FIG. 11.

FIG. 13 is a rear perspective view of the end cap assembly 216. Each contact 250 includes a spring arm 260 generally opposite the pin 262. The spring arm 260 extends rearward from the connector body 252. The spring arm 260 has a mating portion 264 configured to engage the circuit board 224 (shown in FIGS. 11 and 12).

The end cap body 246 includes a lip 266 circumferentially surrounding a cavity 268 that receives a portion of the light tube 212 (shown in FIGS. 11 and 12) therein. The end cap body 246 includes a lens engagement surface 270 on an interior portion of the lip 266.

The connector body 252 includes mounting arms 272 extending rearward therefrom. The mounting arms 272 have a ledge 274 extending outward therefrom.

Figure 14:
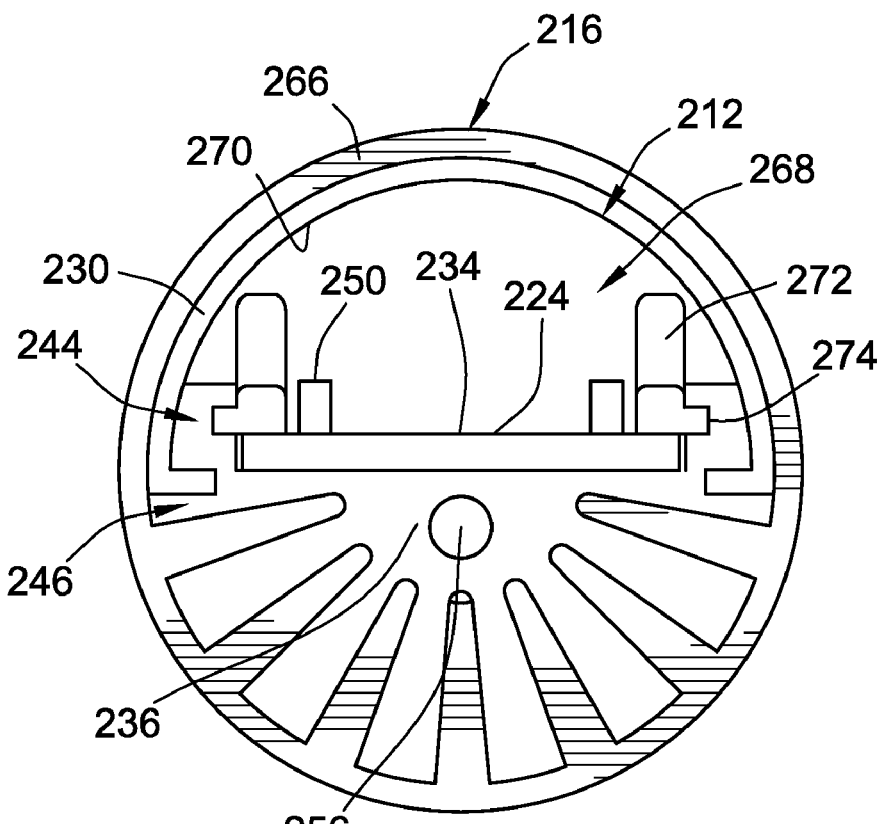
FIG. 14 is a rear sectional view of the light tube and end cap assembly shown in FIG. 11.

FIG. 14 is a rear sectional view of the light tube 212 and the end cap assembly 216. The end cap assembly 216 is coupled to the light tube 212 such that the contacts 250 engage the outer surface 234 of the circuit board 224. For example, the contacts 250 may engage contact pads 280 (shown in FIG. 12). The ledge 274 of the mounting arms 272 are received in the rails 244 of the heatsink 236. The lens 230 is coupled to the heatsink 236. For example, a portion of the lens 230 extends into the rails 242. The end cap 216 is coupled to the light tube 212 such that the lens 230 fits within the cavity 268 and engages the lens engagement surface 270 on an interior portion of the lip 266. The fastener 256 is secured to the heatsink 236 to securely couple the end cap assembly 216 to the light tube 212.

Figure 15:
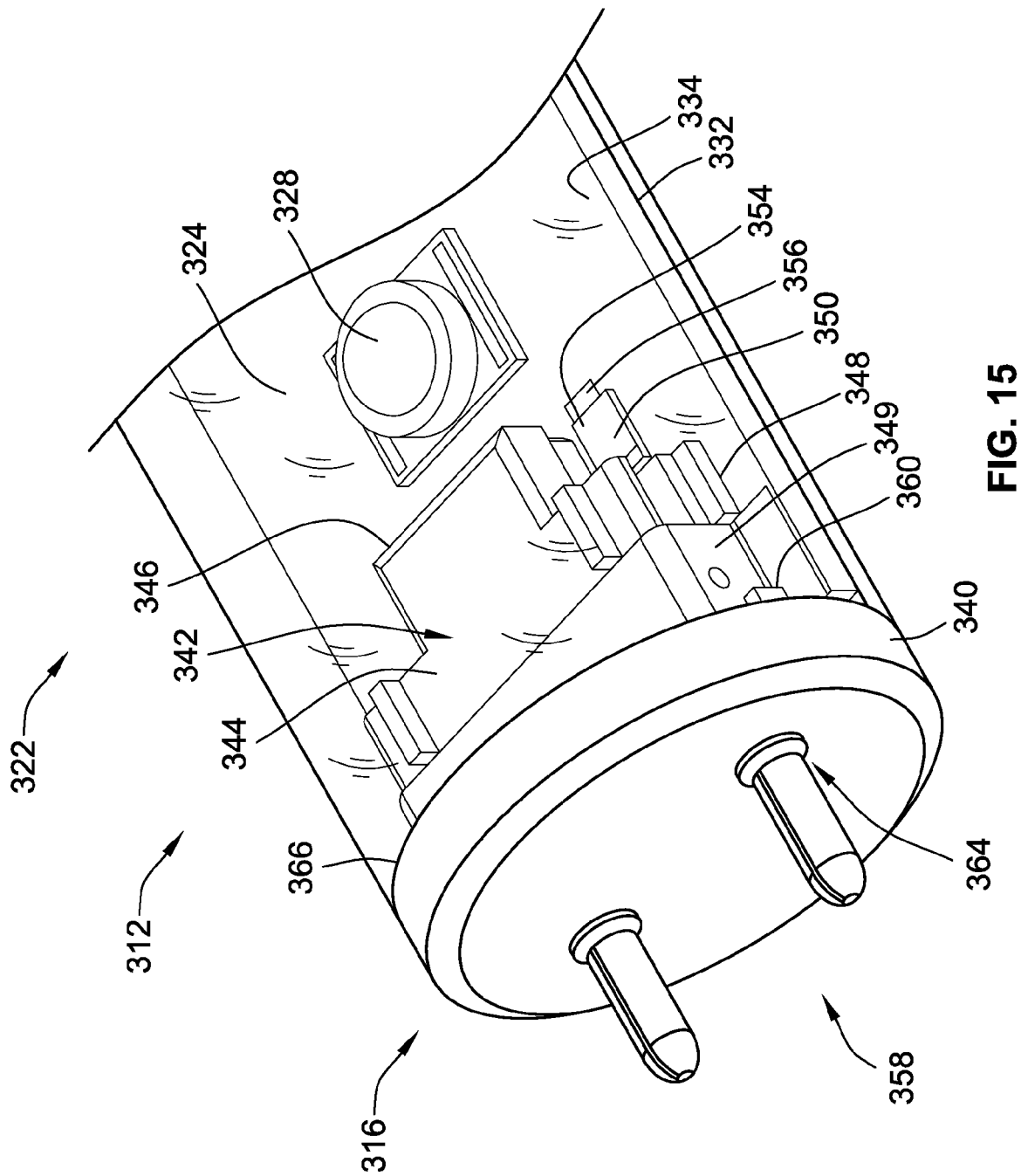
FIG. 15 illustrates another alternative light tube and end cap assembly.
Figure 16:
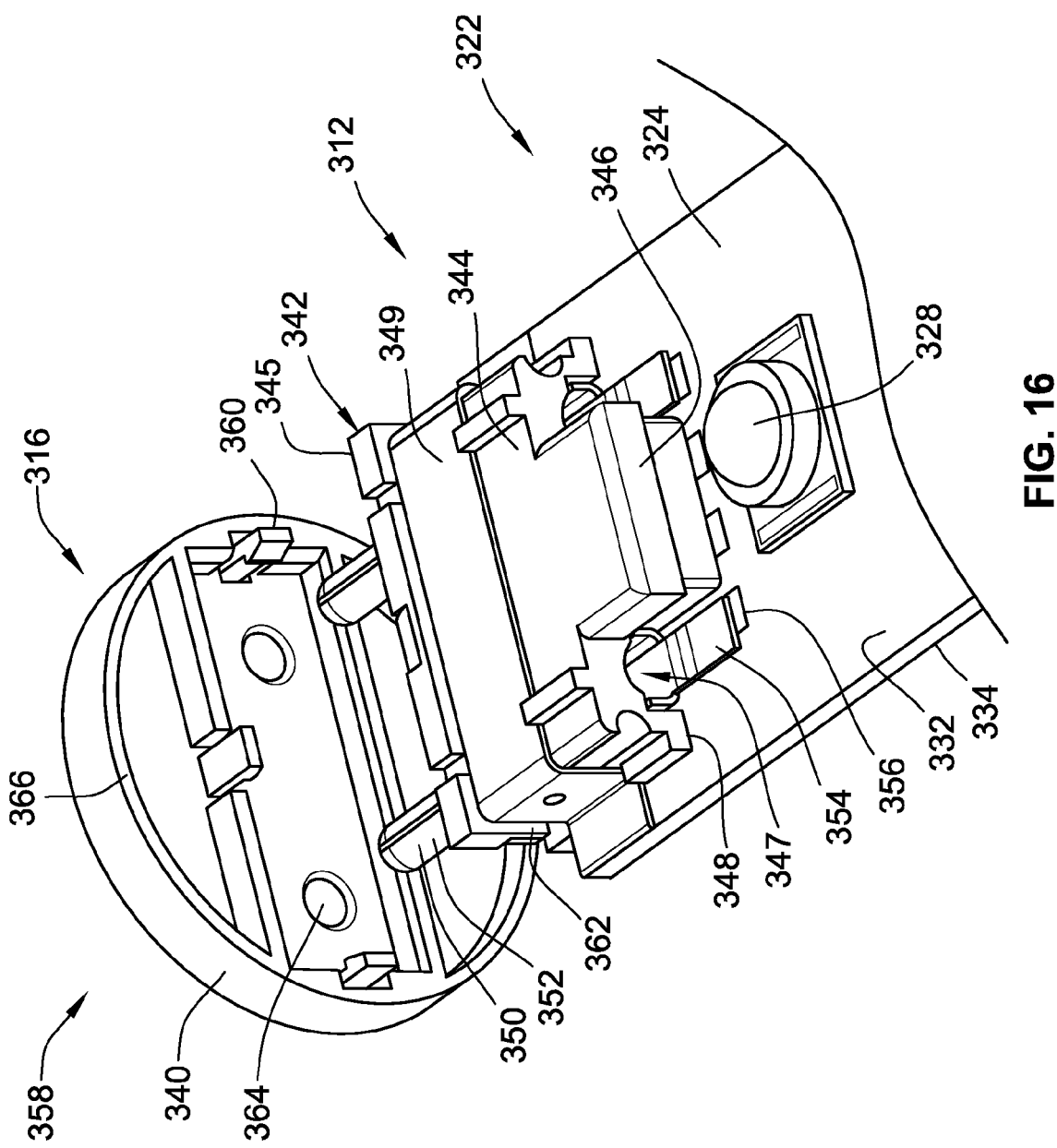
FIG. 16 is an exploded perspective view of the light tube and end cap assembly shown in FIG. 15.

FIG. 15 illustrates another alternative solid state light tube 312 and end cap assembly 316. FIG. 16 is an exploded perspective view of the light tube 312 and the end cap assembly 316. The light tube 312 and the end cap assembly 316 may be utilized with a similar type of socket connector as the light tube 212 and end cap assembly 216 (shown in FIGS. 11 and 12).

The light tube 312 includes one or more circuit boards 324 with LEDs 328 mounted thereto. A lens (not shown) may at least partially circumferentially surround the circuit board 324 and the LEDs 328. The circuit board 324 includes an inner surface 332 and an outer surface 334. The LEDs 328 are mounted to the outer surface 334 and light is emitted outward (for example, approximately 180°) from the outer surface 334. In the illustrated embodiment, no LEDs 328 are mounted to the inner surface 332, and light is not emitted outward from the inner surface 332.

The light tube 312 may include a heatsink (not shown). The heatsink may extend along the inner surface 332 of the circuit board 324. Heat generated by the circuit board 324 and/or the LEDs 328 is transferred to the heatsink and dissipated therefrom. The heatsink may include a plurality of fins.

The end cap assembly 316 is mounted to the end of the light tube 312. The end cap assembly 316 has an end cap body 340 and an end cap connector 342 extending therefrom. The connector 342 is separately provided from the end cap body 340 and the end cap body 340 is coupled to the connector 342. The connector 342 includes a connector body 344 having a front 345 and a rear 346. Channels 347 extend between the front and rear 345, 346. The connector body 344 includes a bottom 348 that rests upon the outer surface 334 of the circuit board 324. A securing feature 349 engages the connector body 344 to hold the connector body 344 against the circuit board 324. In an exemplary embodiment, the securing feature 349 represents a securing strap that extends along the sides and the top of the connector body 344 to hold down the connector body 344 against the circuit board 324. The securing feature 349 may be metal and may be soldered to the circuit board 324. Alternatively, the securing feature 349 to be securely coupled to the circuit board 324 or another component of the light tube 312 to hold the connector body 344 in place.

The connector 342 includes a pair of contacts 350 that are configured to electrically connect with mating contacts of the socket connector and with the circuit board 324. The contacts 350 are held within the channels 347 of the connector body 344. In the illustrated embodiment, the contacts 350 define pins 352 having circular cross-sections at the front of the contacts 350. The pins 352 extend forward of the connector body 344 and the end cap body 340. The pins 352 are configured to be coupled with a bi-pin type socket connector, such as those typical of a fluorescent lamp fixture. The contacts 350 have mating portions 354 generally opposite the pins 352 that engage contact pads 356 on the circuit board 324. The mating portions 354 extending rearward from the channels 347. Optionally, the mating portions 354 may be soldered to the contact pads 356. Alternatively, the mating portions 354 may be releasably coupled to the contact pads 356 and may be held against the contact pads 356 by a spring force.

The end cap assembly 316 defines a mating interface 358 configured for mating with one of the socket connectors. In an exemplary embodiment, the mating interface 358 is substantially similar to the mating interface 254 (shown in FIGS. 11 and 12). The mating interface 358 is defined by the pins 352 and the outer end of the end cap body 340. The outer end of the end cap body 340 is substantially flat and planar. The pins 352 extend outward from the outer end of the end cap body 340.

The end cap body 340 includes latches 360 for securing the end cap body 340 to the connector 342. The latches 360 engage a latching surface 362 of the connector 342 to securely couple the end cap body 340 to the connector 342. Alternatively, the latches 360 may be coupled to a lens or a heat sink. When assembled, the contacts 350 extend through openings 364 in the end cap body 340. The end cap body 340 also includes a lens engagement surface 366 at a rear of the end cap body 340.

Figure 17:
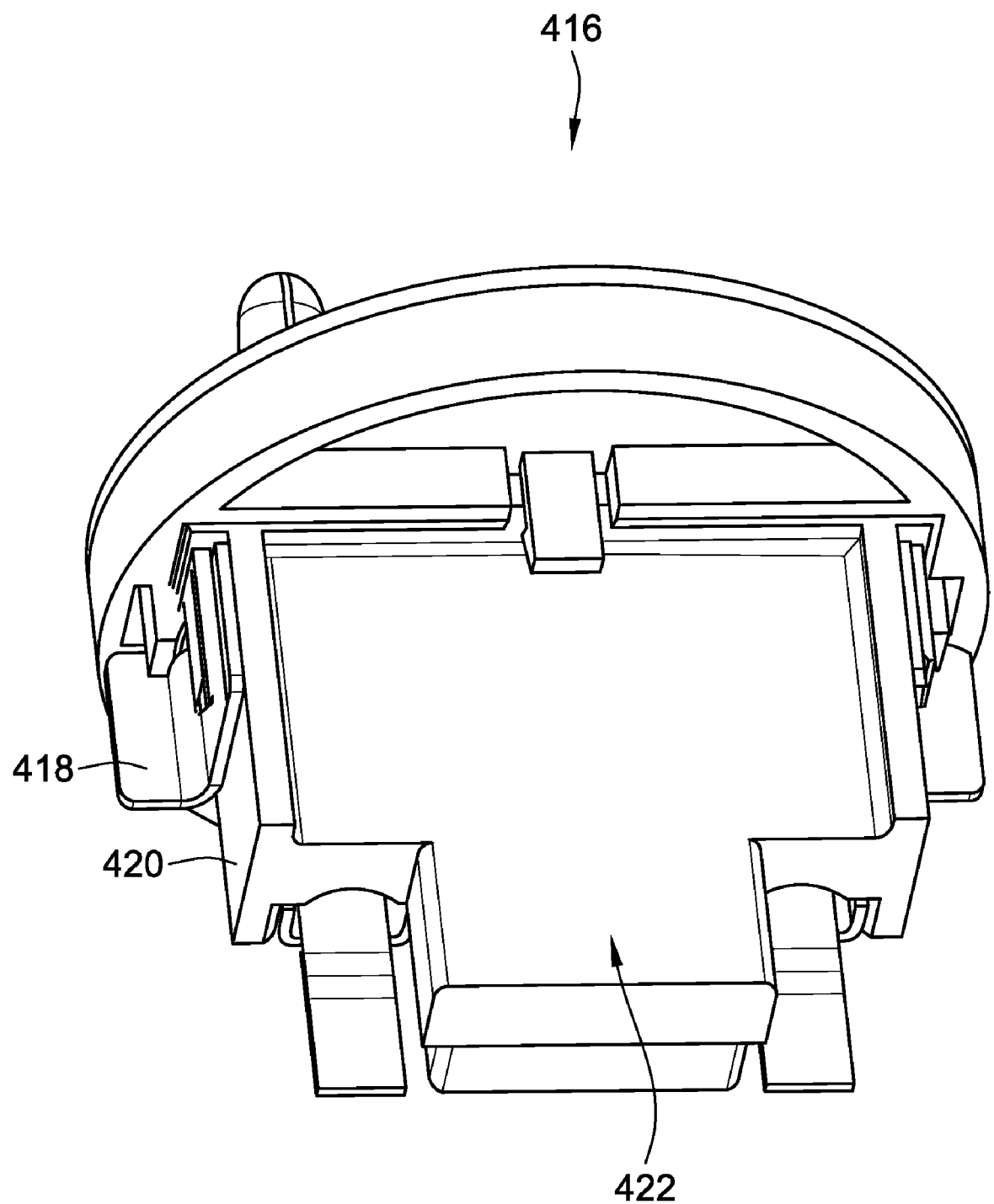
FIG. 17 is a top perspective view of an alternative end cap assembly for the light tube shown in FIG. 15.

FIG. 17 is a top perspective view of an alternative end cap assembly 416 for the light tube 312 (shown in FIGS. 15 and 16). The end cap assembly 416 is similar to the end cap assembly 316 (shown in FIGS. 15 and 16), however the end cap assembly 416 includes securing features 418 that differ from the securing feature 349 (shown in FIGS. 15 and 16). For example, the securing features 418 extend along sides 420 of an end cap connector 422 of the end cap assembly 416. The securing features 418 are not interconnected with one another by a band extending across the top of the connector 422. The securing features 418 are held in place by the connector 422. The securing features 418 may be soldered or otherwise mechanically attached to the circuit board 324 (shown in FIGS. 15 and 16).

Figure 18:
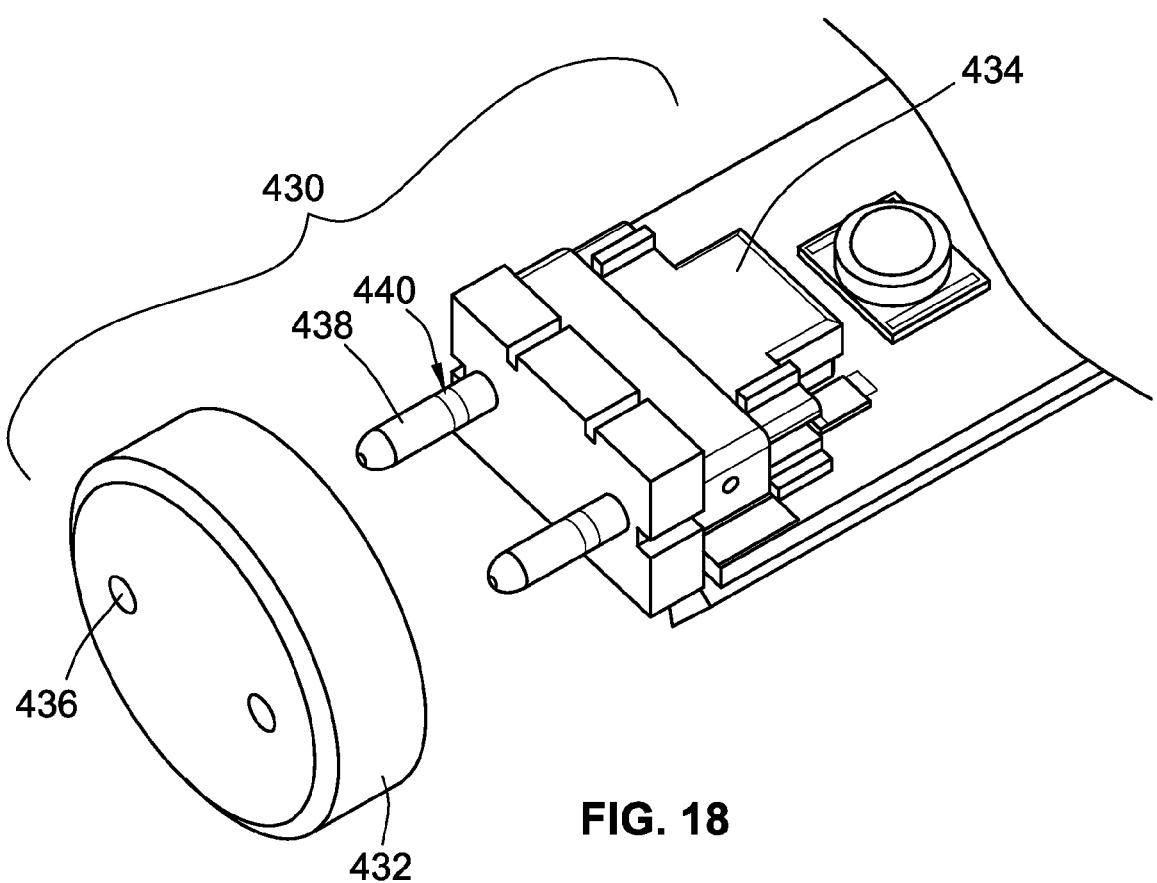
FIG. 18 is a front perspective view of another alternative end cap assembly for the light tube shown in FIG. 15.

FIG. 18 is a front perspective view of another alternative end cap assembly 430 for the light tube 312 (shown in FIGS. 15 and 16). The end cap assembly 430 is similar to the end cap assembly 316 (shown in FIGS. 15 and 16), however the end cap assembly 430 includes an end cap body 432 that is secured to an end cap connector 434 in a different manner. The end cap body 432 includes openings 436 therethrough. The connector 434 includes contacts 438. The contacts 438 have notches 440 that fit within the openings 436. The end cap body 432 is secured to the connector 434 when the end cap body 432 engages the notches 440.

Figure 19:
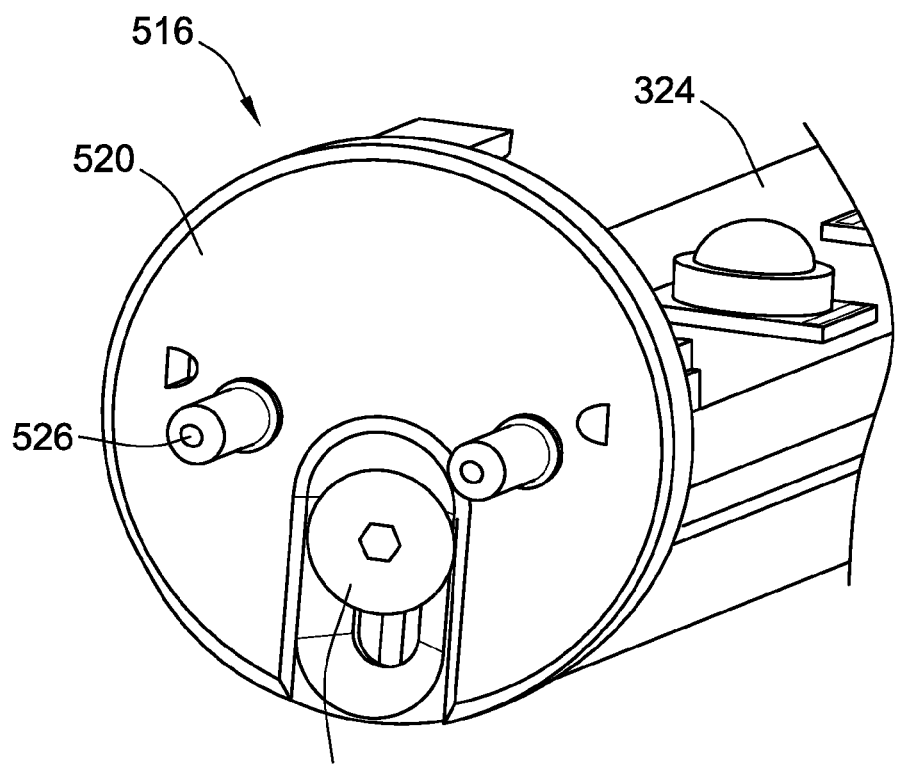
FIG. 19 is a front perspective view of a further alternative end cap assembly for the light tube shown in FIG. 15.
Figure 20:
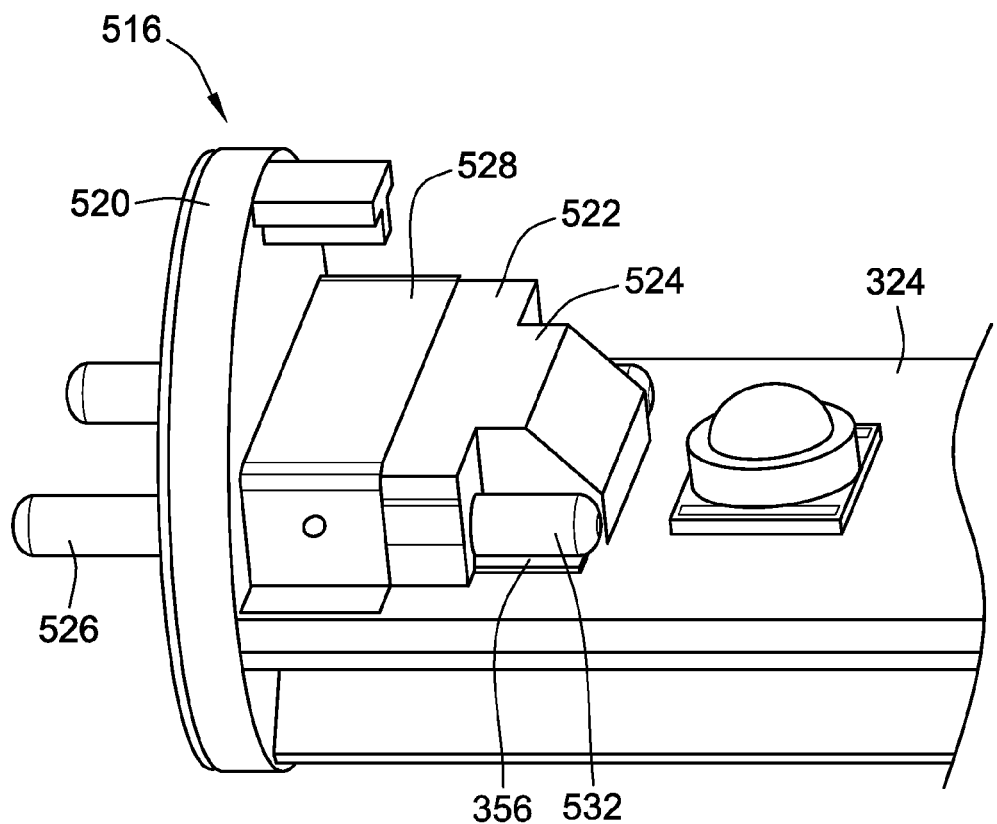
FIG. 20 is a rear perspective view of the end cap assembly shown in FIG. 19.

FIG. 19 is a front perspective view of a further alternative end cap assembly 516 for the light tube 312 (shown in FIGS. 15 and 16). FIG. 20 is a rear perspective view of the end cap assembly 516. The end cap assembly 516 includes an end cap body 520 and an end cap connector 522.

The connector 522 includes a connector body 524 holding a pair of contacts 526. In the illustrated embodiment, the connector body 524 is integrally formed with the end cap body 520. The connector body 524 is secured to the circuit board 324 by a securing feature 528. The securing feature 528 may be secured to the circuit board 324, such as by soldering the securing feature 528 thereto. The end cap body 520 and the connector 522 may be securely coupled to the light tube 312 by a fastener 530.

The contacts 526 are represented by pin contacts having a generally circular cross-section. The contacts 526 may be solid metal contacts formed into a pin shape. Alternatively, the contacts 526 may be stamped and formed by rolling the blank contact into a tubular shape. The contacts 526 include mating portions 532 that are electrically connected to contact pads 356 of the circuit board 324.

Figure 21:
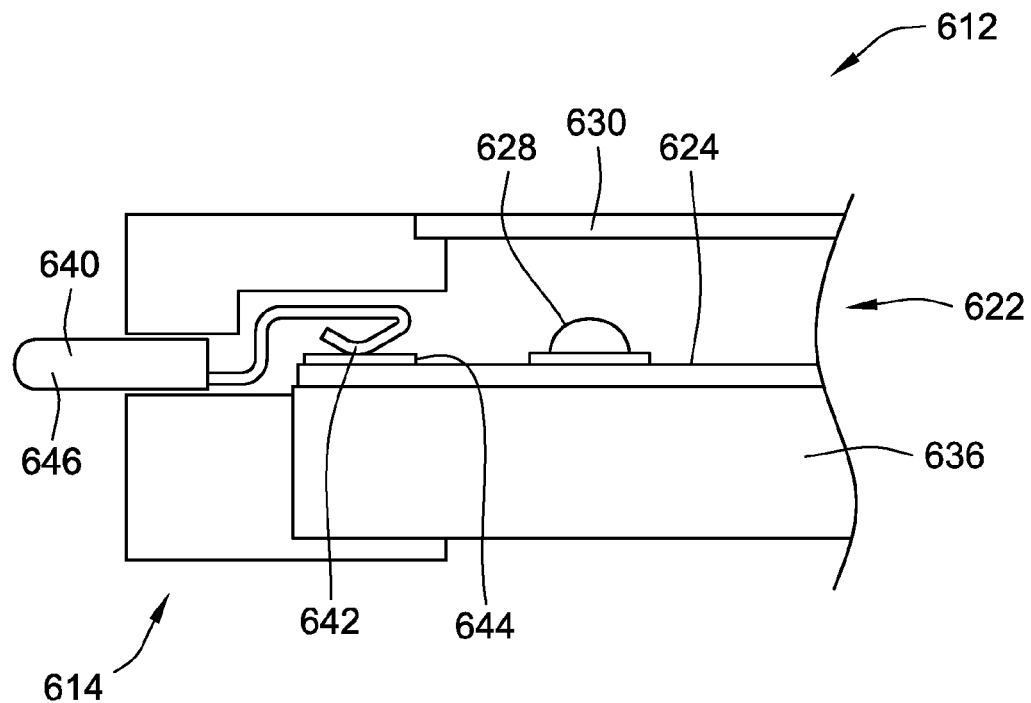
FIG. 21 illustrates another alternative light tube and end cap assembly.

FIG. 21 illustrates another alternative light tube 612 and end cap assembly 614. The light tube 612 includes a light tube 622 having one or more circuit boards 624 with LEDs 628 mounted thereto. A lens 630 may at least partially circumferentially surround the circuit board 624 and the LEDs 628. A heatsink 636 extends along the circuit board 624 to dissipate heat generated by the circuit board 624 and/or the LEDs 628.

The end cap assembly 616 is mounted to the end of the light tube 622. The end cap assembly 616 includes at least one contact 640 having a first mating portion 642 configured to engage a corresponding contact pad 644 on the circuit board 624. The contact 640 has a second mating portion 646 configured to engage a mating contact of a socket connector (not shown). The first mating portion 642 is represented by a spring beam, however the first mating portion 342 may be of a different type. The spring beam is folded over to provide a downward biasing force against the contact pad 644. The second mating portion 646 is represented by a pin contact, however the second mating portion 646 may be of a different type.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. An end cap assembly for a solid state light tube that has a circuit board with solid state lighting devices mounted thereto and a lens covering the circuit board, the end cap assembly comprising:

an end cap body having a lens engagement surface configured to engage the lens, the end cap body having an external mating interface configured to mate with a socket connector of a fixture; and an end cap connector extending from the end cap body, the end cap connector holds contacts having first mating portions, the first mating portions comprising arms defining spring beams that provide an engagement force in the direction of the circuit board to maintain contact between the arms and the circuit board, the arms being configured to engage and be electrically connected to the circuit board at a separable mating interface and the contacts having second mating portions configured to engage and be electrically connected to the socket connector.

2. The end cap assembly of claim 1, wherein the end cap connector has a connector body holding contacts, the connector body either being formed integral with the end cap body or being separately provided from and coupled to the end cap body.

3. The end cap assembly of claim 1, wherein the end cap body has a circular cross-section.

4. The end cap assembly of claim 1, wherein the end cap body includes an inner end and an outer end, the inner end facing the light tube, the outer end facing the socket connector, the end cap body having a nipple extending outward from the outer end, the nipple having a chamber configured to receive a portion of the socket connector, the contacts being exposed within the chamber.

5. The end cap assembly of claim 1, wherein the light tube includes opposing circuit boards arranged back-to-back and having outer surfaces facing in opposite directions, the contacts include a third mating portion comprising arms defining spring beams that provide an engagement force in the direction of the circuit board to maintain contact between the arms and the circuit board, the arms of the third mating portion engaging the outer surface of one of the circuit boards, the arms of the first mating portion engaging the outer surface of the opposite circuit board.

6. The end cap assembly of claim 1, wherein the end cap body includes an alignment feature engaging a portion of the light tube to orient the end cap body with respect to the light tube.

7. The end cap assembly of claim 1, wherein the end cap connector includes a slot configured to receive an edge of the circuit board, the contacts being held by the end cap connector to mate with contact pads on the circuit board when the circuit board is received in the slot.

8. The end cap assembly of claim 1, wherein the contacts are stamped and formed, the contacts define rolled pins at the second mating portion having a circular cross-section.

9. The end cap assembly of claim 1, wherein the end cap body includes an inner end and an outer end, the inner end facing the light tube, the outer end facing the socket connector, the outer end being generally planar, the contacts define pins extending outward from the outer end for interfacing with the socket connector.

10. The end cap assembly of claim 1, wherein the contacts are separable from the circuit board by removing the end cap body from the light tube.

11. A lighting system for connecting a solid state light tube to more than one type of socket connector where each type of socket connector has a different mating interface, the light tube having a circuit board with one or more solid state lighting devices mounted thereto and a lens covering the circuit board, the lighting system comprising:

first and second end cap assemblies, each of the first and second end cap assemblies having an end cap body having a lens engagement surface configured to engage the lens, and each of the first and second end cap assemblies having an end cap connector extending from the end cap body that holds contacts comprising arms defining spring beams that provide an engagement force in the direction of the circuit board to maintain contact between the arms and the circuit board, the arms being configured to engage and be electrically connected to the circuit board at a separable interface and the contacts being configured to engage and be electrically connected to the corresponding socket connector;

wherein the end cap body of the first end cap assembly defines a first mating interface configured to mate with a first type of socket connector and the end cap body of the second end cap assembly defines a second mating interface configured to mate with a second type of socket conductor.

12. The lighting system of claim 11, wherein each end cap body includes an inner end and an outer end, the inner end facing the light tube, the outer end facing the socket connector, wherein the end cap body of the first end cap assembly includes a nipple extending outward from the outer end, the nipple having a chamber configured to receive a portion of the first socket connector, the contacts being exposed within the chamber to engage mating contacts of the first type of socket connector, and wherein the end cap body of the second end cap assembly has a planar outer end with the contacts thereof extending outward from the outer end for interfacing with mating contacts of the second type of socket connector.

13. The lighting system of claim 11, wherein the first mating interface is configured to mate with a bi-pin socket connector of a fluorescent lamp fixture, and wherein the second mating interface is configured to mate with the recessed double contact base socket connector of a fluorescent lamp fixture.

14. The lighting system of claim 11, wherein each end cap connector includes a connector body mounted to the circuit board such that the contacts are aligned with contact pads on the circuit board, the contacts being soldered to the contact pads.

15. The lighting system of claim 11, wherein the contacts are separable from the circuit board by removing the corresponding end cap body from the light tube.

16. A lighting system comprising:
a light tube having a circuit board with a plurality of solid state lighting devices electrically connected thereto and a lens covering the circuit board, the lens extending at least partially circumferentially around the circuit board; and an end cap assembly mounted to the light tube, the end cap assembly having an end cap body engaging the lens and a mating interface configured to mate with a socket connector of a fixture, and the end cap assembly having an end cap connector extending from the end cap body, the end cap connector holding contacts having first mating portions, the first mating portions comprising arms defining spring beams that provide an engagement force in the direction of the circuit board to maintain contact between the arms and the circuit board, the arms engaging and being electrically connected to the circuit board at a separable mating interface and having second mating portions configured to engage and be electrically connected to the socket connector.

17. The lighting assembly of claim 16, wherein the light tube and the end cap assembly are configured to replace a fluorescent bulb, wherein the end cap assembly is configured to mate with a socket connector of a fluorescent lamp fixture.

18. The lighting assembly of claim 16, wherein the light tube generally has a size and shape of a fluorescent tube.

19. The lighting assembly of claim 16, wherein the light tube further comprises a heatsink, the circuit board being mounted in thermal communication with the heatsink.

20. The lighting assembly of claim 16, wherein each contact extends between a first end and a second end, the first mating portion being defined at the first end, the second mating portion being defined at the second end, the first mating portion being integral with the second mating portion.

21. The end cap assembly of claim 1, wherein each contact extends between a first end and a second end, the first mating portion being defined at the first end, the second mating portion being defined at the second end, the first mating portion being integral with the second mating portion.

22. The end cap assembly of claim 1, wherein the circuit board includes contact pads on the circuit board, the arms of the contacts comprising deflectable spring beams that are configured to engage and be spring biased against the contact pads on the circuit board.

23. The lighting system of claim 11, wherein each contact extends between a first end and a second end, the first mating portion being defined at the first end, the second mating portion being defined at the second end, the first mating portion being integral with the second mating portion.

* * * * *